(12) United States Patent
Itakura et al.

(10) Patent No.: US 8,782,449 B2
(45) Date of Patent: Jul. 15, 2014

(54) POWER SUPPLY SYSTEM WITH A PLURALITY OF POWER SUPPLY UNITS CAPABLE OF POWERING A PLURALITY OF LOAD UNITS DEPENDING ON THE TYPE AND OPERATION STATE OF EACH LOAD UNIT

(75) Inventors: Kazuhiko Itakura, Kawasaki (JP); Hiroshi Yamaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 160 days.

(21) Appl. No.: 13/004,316

(22) Filed: Jan. 11, 2011

(65) Prior Publication Data
US 2011/0191612 A1      Aug. 4, 2011

(30) Foreign Application Priority Data

Jan. 29, 2010   (JP) .................................. 2010-19759

(51) Int. Cl.
G06F 1/00      (2006.01)
G06F 1/26      (2006.01)
G06F 1/32      (2006.01)
H02J 1/04      (2006.01)

(52) U.S. Cl.
CPC ................ *G06F 1/3203* (2013.01); *G06F 1/26* (2013.01)
USPC ............................... 713/320; 713/300; 307/60

(58) Field of Classification Search
None
See application file for complete search history.

(56) References Cited

U.S. PATENT DOCUMENTS

| | | | |
|---|---|---|---|
| 6,166,455 A * | 12/2000 | Li | 307/43 |
| 2005/0094422 A1* | 5/2005 | Hoffmann et al. | 363/65 |
| 2006/0138867 A1* | 6/2006 | Tian et al. | 307/65 |
| 2009/0094467 A1* | 4/2009 | Baba et al. | 713/300 |
| 2009/0217060 A1 | 8/2009 | Tsuchiya | |
| 2009/0307514 A1* | 12/2009 | Roberts et al. | 713/330 |

FOREIGN PATENT DOCUMENTS

| | | |
|---|---|---|
| JP | 9-56064 | 2/1997 |
| JP | 10-201090 | 7/1998 |
| JP | 2003-348819 | 12/2003 |
| JP | 2009-201244 | 9/2009 |

OTHER PUBLICATIONS

Office Action issued by the Japanese Patent Office on Oct. 1, 2013 in the corresponding Japanese patent application No. 2010-019759.

* cited by examiner

*Primary Examiner* — Thomas Lee
*Assistant Examiner* — Robert Cassity
(74) *Attorney, Agent, or Firm* — Staas & Halsey LLP

(57) ABSTRACT

A power supply system includes a plurality of power supply units that each includes an output terminal connected each other in parallel to other output terminals each included in other power supply units and connected to a plurality of load units, a power supply section that inputs an input voltage and outputs a first output voltage from the output terminal to the plurality of load units, and a shut-off control section that shuts off the output of the first output voltage from the output terminal based on an inputted stand-by signal, and a management control unit that inputs a configuration information representing a configuration of each of the plurality of load units in which the first voltage is inputted, and outputs the stand-by signal to any of the plurality of power supply units based on the configuration information.

9 Claims, 22 Drawing Sheets

FIG. 2
PRIOR ART
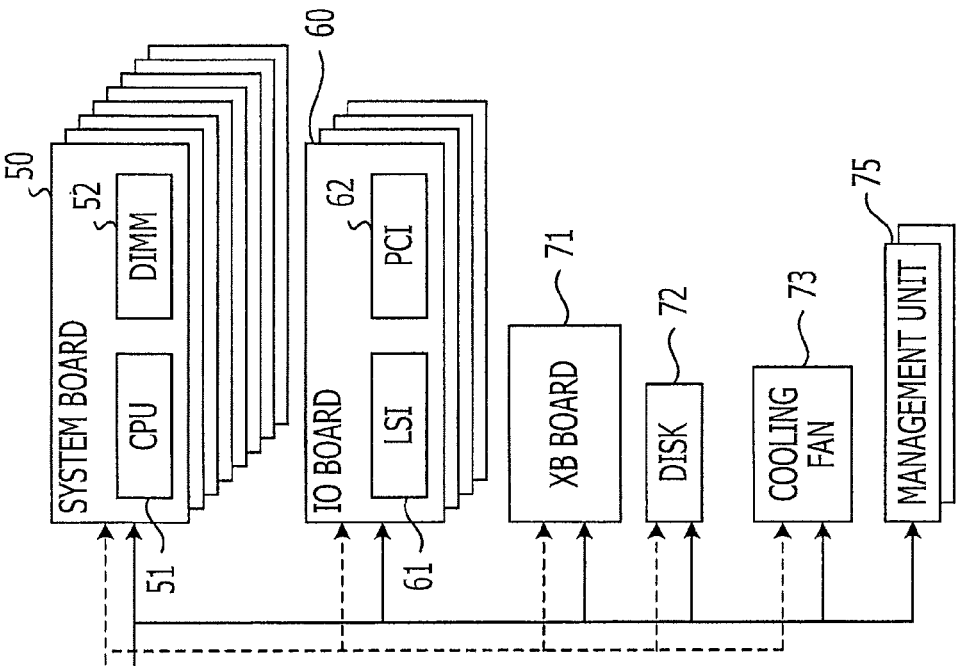
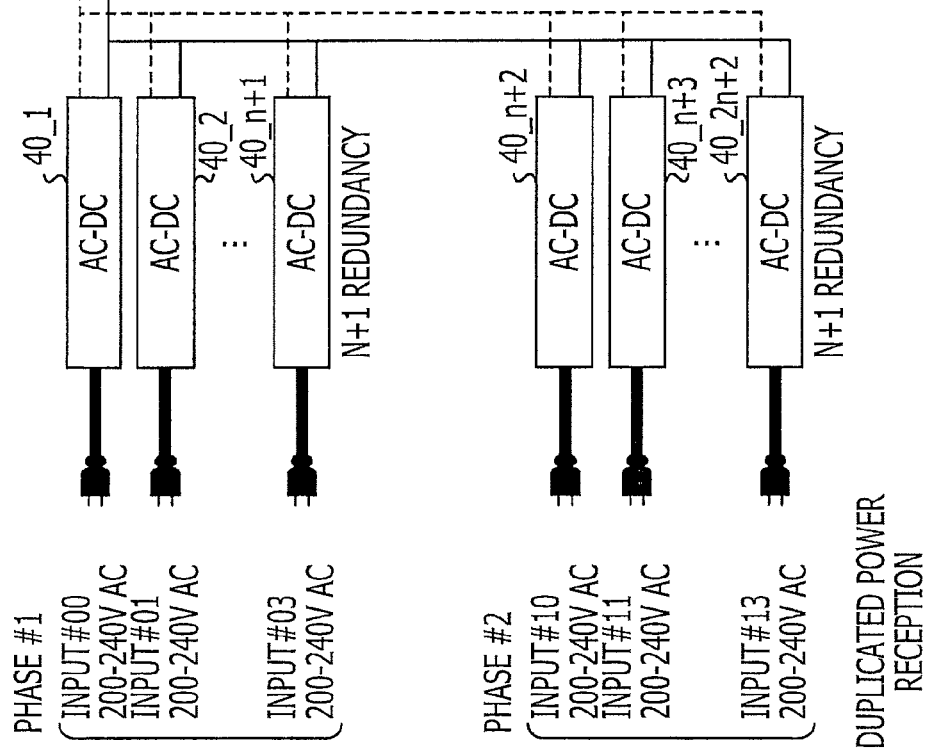

FIG. 9

| NUMBER OF POWER SUPPLY UNIT IN NORMAL OPERATION | NUMBER OF POWER UNIT TO BE USED | |
|---|---|---|
| | REDUNDANT | NON-REDUNDANT |
| n+1 | 2 | 1 |
| 2 OR MORE | 2 | 1 |
| 1 | 2 | 1 |

FIG. 11

```
[LOAD UNIT CONFIGURATION INFORMATION]

STATE      CPU   MEN    IO    [NO.]
    UNIT 1    STAND-BY    2    16     4
    UNIT 2    STAND-BY    1     8     4
```

```
[LOAD UNIT CURRENT SIGNAL]

CURRENT VALUE
    UNIT 1        1A
    UNIT 2        1A
```

```
[CONFIGURATION-DEPENDENT EXPECTED CURRENT VALUE]
(STORE IN NONVOLATILE MEMORY OF MANAGEMENT UNIT IN PROCESS
OF MANUFACTURING COMPUTER APPARATUS)

EXPECTED VALUE
    STAND-BY STATE      1A
       1 CPU           10A
       1 MEM            0.5A
       1 IO             1A
```

FIG. 13

```
[CONTROL LOGIC OF MANAGEMENT UNIT]
         OPERATION INSTRUCTIONS      | NO. OF POWER OUTPUTS
  UNIT 1    STAND-BY OR OPERATING    | ·REDUNDANT = 2 TO n+1
  UNIT 2    STAND-BY OR OPERATING    | ·NON-REDUNDANT = 1 TO n
   ...
  UNIT n    STAND-BY OR OPERATING
```

```
EXAMPLE 1
         OPERATION INSTRUCTIONS      | NO. OF POWER OUTPUTS
  UNIT 1       STAND-BY              | REDUNDANT = 2
  UNIT 2       STAND-BY              | NON-REDUNDANT = 1
  UNIT 3       STAND-BY
```

```
EXAMPLE 2
         OPERATION INSTRUCTIONS      | NO. OF POWER OUTPUTS
  UNIT 1       OPERATING             | REDUNDANT = 3
  UNIT 2       OPERATING             | NON-REDUNDANT = 2
  UNIT 3       STAND-BY
```

POWER SUPPLY SYSTEM WITH A PLURALITY OF POWER SUPPLY UNITS CAPABLE OF POWERING A PLURALITY OF LOAD UNITS DEPENDING ON THE TYPE AND OPERATION STATE OF EACH LOAD UNIT

CROSS-REFERENCE TO RELATED APPLICATIONS

This application is based upon and claims priority to prior Japanese Patent Application No. 2010-19759 filed on Jan. 29, 2010 in the Japan Patent Office, the entire contents of which are incorporated herein by reference.

FIELD

The embodiments discussed herein relate to a power supply system, an electronic apparatus, and a method for controlling the power supply system.

BACKGROUND

Progress of advanced information society in recent years has caused increasing power consumption of electronic apparatuses, such as computers, which are served as information processing apparatuses. Therefore, the electronic apparatuses have been designed to include a plurality of power supply devices by which electric power can be supplied. For example, there is a known technology for a power supply system in which four power supply devices with a power capacity of 1,500 W are mounted on an electronic apparatus with a power consumption of 6,000 W.

In addition, another technology, which has been known in the art, is to change the number of power supply devices to be operated depending on load variation.

Japanese Laid-open Patent Publication No. 9-56064, Japanese Laid-open Patent Publication No. 2009-201244, Japanese Laid-open Patent Publication No. 10-201090, Japanese Laid-open Patent Publication No. 2003-348819 are examples of related art.

A power supply device (hereinafter, also referred to as a power supply unit), which has been used in the conventional electronic apparatus, is designed to adapt to both the operating state and the stand-by state of the electronic apparatus. That is, the power supply unit is constructed of a high-efficiency main power supply and a built-in stand-by power supply with efficiency lower than that of the main power supply. The power supply unit has two or more outputs, one from the main power supply and the other from the stand-by power supply. The electronic apparatus is provided with a service processor for system management. The service processor checks the hardware configuration of the apparatus including a central processing unit (CPU), a memory, a power supply unit, a cooling fan, and so on in the electronic apparatus in the stand-by state. Then, the service processor performs the start-up of the power supply unit and the fan when the electronic apparatus changes from the stand-by state to the operating state. Also, the service processor performs the shut off of the power supply unit and the fan when the electronic apparatus changes from the operating state to the stand-by state.

In the power supply unit with a plurality of outputs, including the main power supply and the stand-by power supply, the main power supply has been designed to have high efficiency to prevent the main power supply from generating internal heat due to a large output current from the main power supply.

On the other hand, the stand-by power supply has been designed to have small efficiency when compared with the main power supply because of a small output current from the stand-by power supply.

However, in recent years, the trends to lower power consumption of the electronic apparatus is to enhance the efficiency of power supply in the state ranging from the low-load idle state where the operating load factor of the electronic apparatus is low to the high-load state where the operating load factor of the electronic apparatus is high. Therefore, the presence of the stand-by power supply, which has low efficiency compared with the main power supply, has been a barrier that prevents the power supply unit from becoming high efficiency.

Since the power supply unit with a plurality of outputs having the stand-by power supply includes two or more power supply circuits, the overall power supply circuit of the power supply unit is complicated. Thus, there is a problem in that a volume per power of the power supply unit is larger than that of a power supply unit only having the output of a main power supply. Furthermore, a power supply unit provided with both the main power supply and the stand-by power supply results in additional manufacturing cost for the circuit of the stand-by power supply.

The power loss of the power supply unit can be roughly classified into the following two types: one is power loss due to the flow of current, i.e., a conduction loss represented by $I \times I \times R$; and the other is power loss due to the presence of a power-supply control circuit, a switching drive circuit, and so on irrespective of current, i.e., driving loss Pd.

The conduction loss $I \times I \times R$ increases in proportion to the square of current. Thus, the power supply unit depicts high efficiency at a load factor of approximately 75% of rated power. For example, the power supply unit becomes 90% of efficiency at a load factor of 80%.

In general, the power supply unit is preferably used with an appropriate load factor for assuring high efficiency of power supply efficiency. It is common to mount a plurality of power supply units on the electronic apparatus that requires the power supply ability of "n" power supply units in practical operation. Specifically, for example, it can be attained by way of "n+1" redundant configuration in which an additional power supply unit is placed, a duplicated power receiving system configuration in which the power supply line is doubled, or several additional power supply units which are mounted in consideration of future enhancement. Therefore, the electronic apparatus having a plurality of power supply units, for example four units, has a small load factor per unit. Thus, each of these power supply units is used with a low load factor. As a result, there is a program in that power supply efficiency decreases each of these power supply units is used with a low load factor. For example, each power supply unit may be used with a load factor of 20% and then each power supply unit may result in an efficiency of 25%. Furthermore, depending on the operation state of the electronic apparatus, a decrease in power supply efficiency may occur even in the case of a decrease in load factor.

For electronic apparatuses of recent years, the types and the numbers of memories, CPUs, and different units to be mounted have been increased. In addition, such electronic apparatuses may use large scale integrated circuits (LSI) that require setting of initial operating conditions. In the stand-by state before the electronic apparatus will shift to the operating state, a stand-by current tends to be increased because the service process for setting the initial operating conditions and checking errors operate in the stand-by state.

However, there is a disadvantage in that a high-current stand-by power supply with low efficiency leads to an increase in heat generation. In addition, there is another disadvantage in that mounting a high-current stand-by power supply with high efficiency requires a complicated control circuit and leads to increases in size and cost of the power supply unit.

Furthermore, there is a problem in that the power supply unit with a low stand-by voltage, such as the power supply unit with a 3.3V (volt) power supply unit or a 5V power supply unit, is difficult to prevent system down when a voltage reduction occurs. That is, the original voltage is as low as 3.3V. In some cases, therefore, the 3.3V-operating electronic apparatus may hardly continue its operation because of short circuit in any of other circuit boards. In the case of the configuration of the electronic apparatus in which a fuse-resistance-diode-capacitor circuit is placed on the input side of a resident power supply line that supplies electric power to a board, the output voltage of the power supply may decrease from 3.5V to a minimum of 2.5V.

In addition, when connecting an alternating current (AC) cable to each power supply unit, a voltage reduction may occur due to over-current if the stand-by current required for the units of the electronic apparatus is large and exceeds the ability of an AC power supply device to supply electric power to each of the power supply unit.

Therefore, the configuration of the electronic apparatus in which a plurality of power supply units having two or more outputs is installed has several disadvantages, such as a reduction in efficiency.

The technology disclosed herein have been made in consideration of the above description and intends to provide a power supply system, an electronic apparatus, and a method for controlling such a power supply system in which the efficiency of power supply is improved.

In the power supply system, the electronic apparatus, and the method for controlling the power supply system disclosed in the present application, a plurality of power supply units where their output terminals are connected to one another in parallel inputs first voltage to a plurality of load units. Then a management control unit outputs a stand-by signal based on configuration information representing the configuration of each load unit to any of the power supply units. The plurality of power supply units shut off the output of the first output voltage in response to the stand-by signal.

In addition, the power supply system, the electronic apparatus, and the method for controlling the power supply system disclosed in the present application outputs first output voltage from a power supply section of a power supply unit in the power supply system to the load unit. A voltage-dividing part of the load unit receives the first output voltage as an input, outputs a second output voltage to an operation part of the load unit in response to instructions from the management control unit, and outputs a third output voltage as long as an input voltage is input.

The power supply system, the electronic apparatus, and the method for controlling the power supply system disclosed in the present application exert advantageous effects of providing those with improved power supply efficiency.

SUMMARY

According to an aspect of an invention, a power supply system includes a plurality of power supply units that each includes an output terminal connected each other in parallel to other output terminals each included in other power supply units and connected to a plurality of load units, a power supply section that inputs an input voltage and outputs a first output voltage from the output terminal to the plurality of load units, and a shut-off control section that shuts off the output of the first output voltage from the output terminal based on an inputted stand-by signal, and a management control unit that inputs a configuration information representing a configuration of each of the plurality of load units in which the first voltage is inputted, and outputs the stand-by signal to any of the plurality of power supply units based on the configuration information.

BRIEF DESCRIPTION OF THE DRAWINGS

FIG. 2 is a diagram illustrating power supply in the configuration of a comparative example;

FIG. 9 is an explanatory diagram illustrating the determination of the control of the power supply unit;

FIG. 11 is an explanatory diagram illustrating the determination of the compatibility between the configuration of the load and the current;

FIG. 13 is an explanatory diagram illustrating the control of determining the number of power supply units;

DESCRIPTION OF THE EMBODIMENTS

Hereinafter, embodiments of a power supply system, an electronic apparatus, and a method for controlling such a power supply system disclosed in the present application will be described with reference to the attached drawings. It is noted that the invention is not limited by any of these embodiments.

Figure 1:
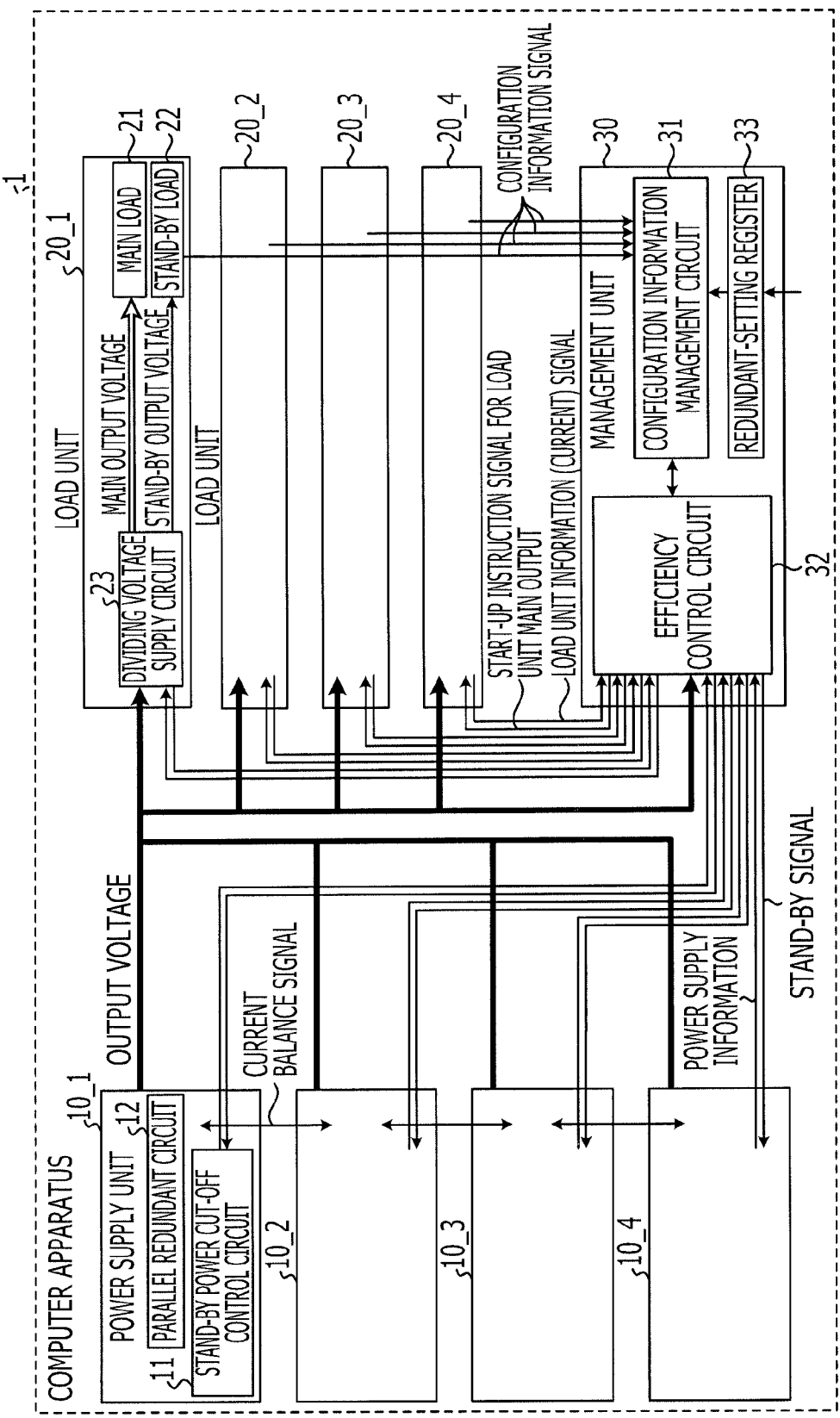
FIG. 1 is a diagram illustrating the configuration of a computer apparatus according to an embodiment.

FIG. 1 is a diagram illustrating the configuration of a computer apparatus as an information processing apparatus according to an embodiment. A computer apparatus 1 depicted in FIG. 1 may be an electronic apparatus to be functioned as a server and includes a plurality of power supply units 10_1 to 10_4, a plurality of load units 20_1 to 20_4, and a management unit 30.

The power supply units 10_1 to 10_4 are single-output power supply units that output single output voltage as first output voltage from their respective output terminals in operating state. Each of the power supply units 10_1 to 10_4 includes a stand-by power cut-off control circuit 11 and a parallel redundant circuit 12.

The stand-by power cut-off control circuit 11 is a cut-off control unit that shuts off output of first output voltage from the output terminal when receiving a waiting signal. In the state where the power supply units 10_1 to 10_4 have suspended output by the stand-by power cut-off control circuit 11, the stand-by power of the output-stopped power supply units 10_1 to 10_4 are decreased. Thus, it can be considered that substantially zero power consumption occurs in comparison with the power consumption of the power supply units 10_1 to 10_4 in the steady state.

The parallel redundant circuits 12 are formed on the respective power supply units 10_1 to 10_4 and serially connected to one another. The parallel redundant circuits 12 send current balance signals to one another. The current balance signals are used for making the levels of output current from the respective power supply units 10_1 to 10_4 in agreement with one another. As an example, any of the power supply units 10_1 to 10_4 is used as a main power supply unit and the others are used as slave power supply units. The master power supply unit outputs an output current level of itself to the slave power supply units. The slave power supply unit receives a current balance signal as an input and then allows the output current level of the unit itself to follow the current balance signal.

The load units 20_1 to 20_4 operate in response to the output voltage from the power supply units, respectively. For example, the load units 20_1 to 20_4 may be a system board, an input/output (IO) board, and a crossbar (XB) board, respectively.

Among the load units 20_1 to 20_4, at least one includes a main load 21, a stand-by load 22, and a dividing voltage supply circuit 23. The main load 21 consumes electric power when the load unit is in operation, while the main load 21 does not consume electric power when the load unit is in the stand-by state. On the other hand, the stand-by load 22 consumes electric power when the load unit is in either the operation state or the stand-by state. In addition, the stand-by load 22 acquires configuration information that represents the hardware resource configuration of a load unit that consumes electric power from each hardware resource and then outputs the acquired configuration information. In other words, the stand-by load 22 acts as a configuration information acquisition section.

The dividing voltage supply circuit 23 is a voltage-dividing unit that inputs the output voltage from each of the power supply units 10_1 to 10_4 and then outputs a main output voltage as a second output voltage to the main load 21 after voltage division. On the other hand, the dividing voltage supply circuit 23 outputs a stand-by output voltage, which is a third output voltage, to the stand-by load 22.

The management unit 30 is a unit that controls start up and shut off of the power supply units 10_1 to 10_4 and a plurality of load units 20_1 to 20_4. The management unit 30 receives power supply unit information including the information about the output voltage from each of the power supply units 10_1 to 10_4. In addition, the management unit 30 receives the load unit information including electric-current information and a configuration information signal from each of the load units 20_1 to 20_4.

The management unit 30 includes a configuration information management circuit 31, an efficiency control circuit 32, and a redundant-setting register 33. The configuration information management circuit 31 is a circuit that receives the configuration information signals from the respective load units 20_1 to 20_4 and then determines the load state of the entire computer apparatus 1. The configuration information signal is a signal which is output from each load unit to notify the user of the type and operation state of hardware mounted on the load unit. The redundant-setting register 33 is a register that retains redundant operation setup information representing whether the redundant operation of the power supply unit begins to start. In other words, the redundant-setting register 33 serves as a section for retaining setting information about redundant operation. The user may set the setting information about redundant operation using any input method.

The efficiency control circuit 32 controls start up and shut off of each of the power supply units and load units depending on the load state of the entire apparatus, the redundant setup information, the power supply unit information, and the load unit information obtained by the configuration information management circuit 31. The output signal of the efficiency control circuit 32 includes a stand-by signal that shuts down each power supply unit and a start-up instruction signal for main output of each load unit, by which the load unit can be started up.

In the computer system depicted in FIG. 1, the management unit 30, which includes the configuration information management circuit 31, the efficiency control circuit 32, and the redundant-setting register 33, operates as a management control unit. In addition, a combination of the power supply units 10_1 to 10_4, the management unit 30, and the dividing voltage supply circuit 23 constitute and operate as a power supply system. Furthermore, the main load 21 and the stand-by load 22 constitute and operate as a load unit.

Figure 3:
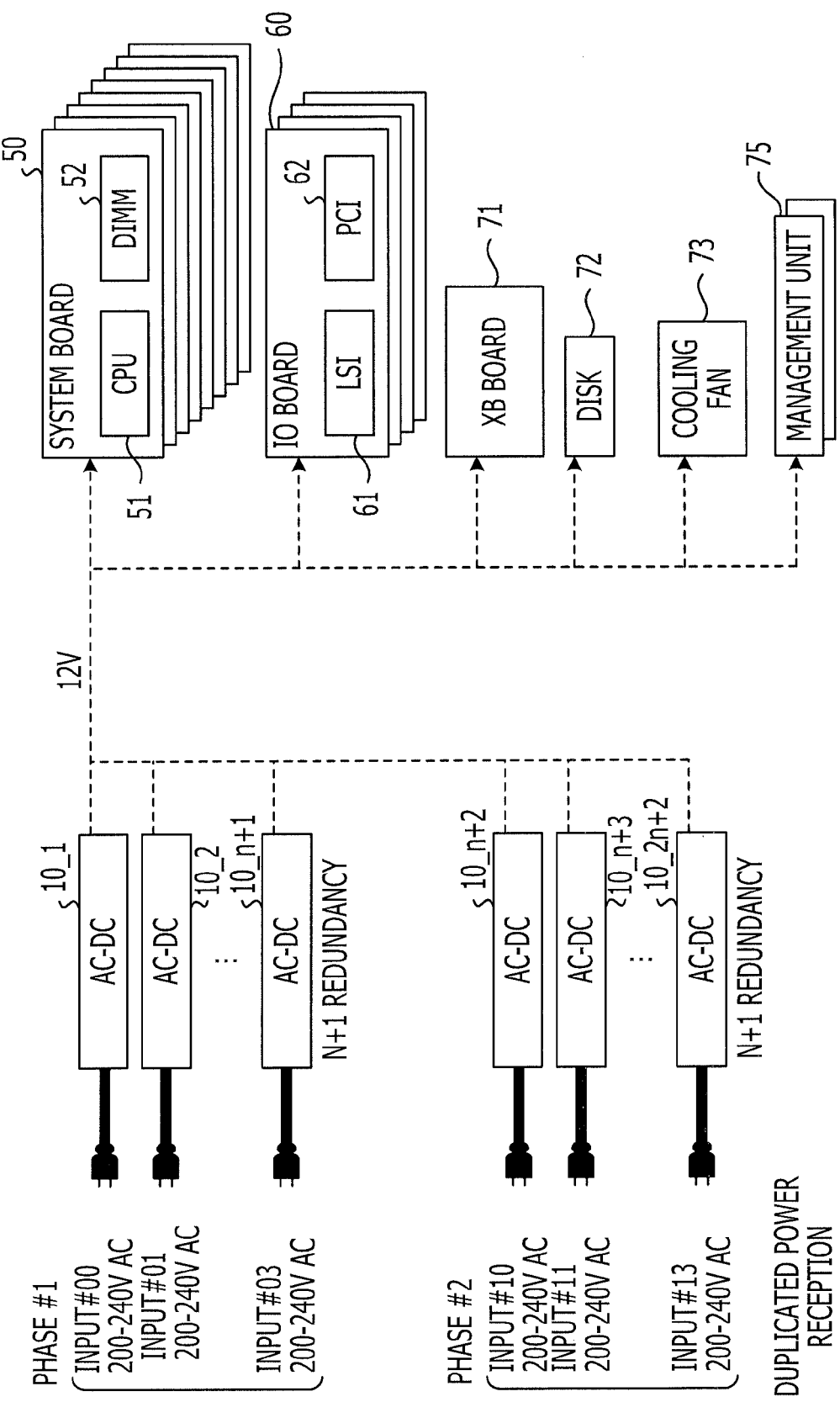
FIG. 3 is a diagram illustrating power supply in the configuration of the embodiment.

Referring now to FIG. 2 and FIG. 3, the power supply in the computer apparatus 1 will be described. FIG. 2 is an explanatory diagram illustrating the power supply in the configuration of a comparative example (hereinafter, referred to as a comparative configuration) for the sake of comparison with the configuration of the present embodiment. FIG. 3 is an explanatory diagram illustrating power supply in the configuration of the present embodiment.

The comparative configuration depicted in FIG. 2 includes a plurality of system boards 50, input/output (IO) boards 60, a crossbar (XB) board 71, and a disk 72 that serves as a storage medium. In addition, the comparative configuration further includes a redundant cooling fan 73 and two control units 75 in redundantly.

The system board 50 includes a central processing unit (CPU) 51 and a dual inline memory module (DIMM) 52. In addition, the I/O board 60 includes a large scale integrated circuit (LSI) 61 and peripheral component interconnect (PCI) bus 62.

The comparative configuration depicted in FIG. 2 performs duplicated power reception, phase #1 and phase #2. The power supply units 40_1 to 40_$n$+1 convert the alternating current (AC) of phase #1 into direct current (DC) and then output the converted current, respectively. Similarly, the power supply units 40_$n$+2 to 40_$2n$+1 convert the alternating current (AC) of phase #2 into direct current (DC) and then output the converted current, respectively.

The power supply units 40_1 to 40_$2n$+2 output two voltages of 48V and 8V, respectively. The voltage of 48V is supplied as a main output voltage to be used when the load of the system board 50, the input/output (IO) board 60, the crossbar (XB) board 71, the disk 72, the cooling fan 73, the management unit 75, or the like are in the operation state. The voltage of 48V is converted into a direct current (DC) of 3.3V or the like as operation voltage of the LSI by a DC-DC converter in each of the system board 50, the I/O board 60, the XB board 71, the disk 72, and so on. In contrast, the voltage of 8V is supplied to each part and serves as stand-by output current to be used when each load is in the stand-by state.

In the comparative configuration of FIG. 2, each of the power supply units 40_1 to 40_$2n$+2 outputs main output voltage and stand-by output voltage, individually.

Like the comparative configuration, the configuration of the present embodiment disclosed in FIG. 3 includes a plurality of system boards 50, IO boards 60, a crossbar (XB) board 71, and a disk 72 that serves as a storage medium. In addition, the comparative configuration further includes a redundant cooling fan 73 and two control units 30 in duplex form.

Each of the system boards 50 includes a CPU 51 and a DIMM 52. In addition, each of the IO boards 60 includes a LSI 61 and a PCI bus 62.

The configuration of the present embodiment depicted in FIG. 3 performs duplicated power reception, phase #1 and phase #2. The power supply units 10_1 to 10_$n$+1 convert the alternating current (AC) of phase #1 into direct current (DC) and then output the converted current, respectively. Similarly, the power supply units 10_$n$+2 to 10_$2n$+1 convert the alternating current (AC) of phase #2 into direct current (DC) and then output the converted current, respectively.

Then, each of the power supply units 10_1 to 10_$2n$+2 output a single voltage of 12V, respectively. Therefore, the single voltage of 12V is input into each of the loads, such the system board 50, the IO board 60, the XB board 71, the disk 72, the cooling fan 73, and the management unit 75. Among the loads, one that requires main output voltage independently of stand-by output voltage allows a voltage of 12V to be branched and one branched voltage of 12V is then divided to provide a main output voltage and a stand-by output voltage.

As described above, in the configuration of the present embodiment, each of the power supply units 10_1 to 10_$2n$+2 output a single voltage. Thus, in comparison with the power supply units 40_1 to 40_$2n$+2 of the comparative configuration, the structure of the power supply unit of the present embodiment can be simplified and the size thereof can be also reduced, thereby attaining cost reduction.

In the configuration of the present embodiment, furthermore, the load that requires main output voltage and stand-by output voltage allows a single output from the power supply unit to be branched and one branched voltage is then divided to obtain main output voltage and stand-by output voltage. Therefore, the efficiency at stand-by can be improved.

Figure 4:
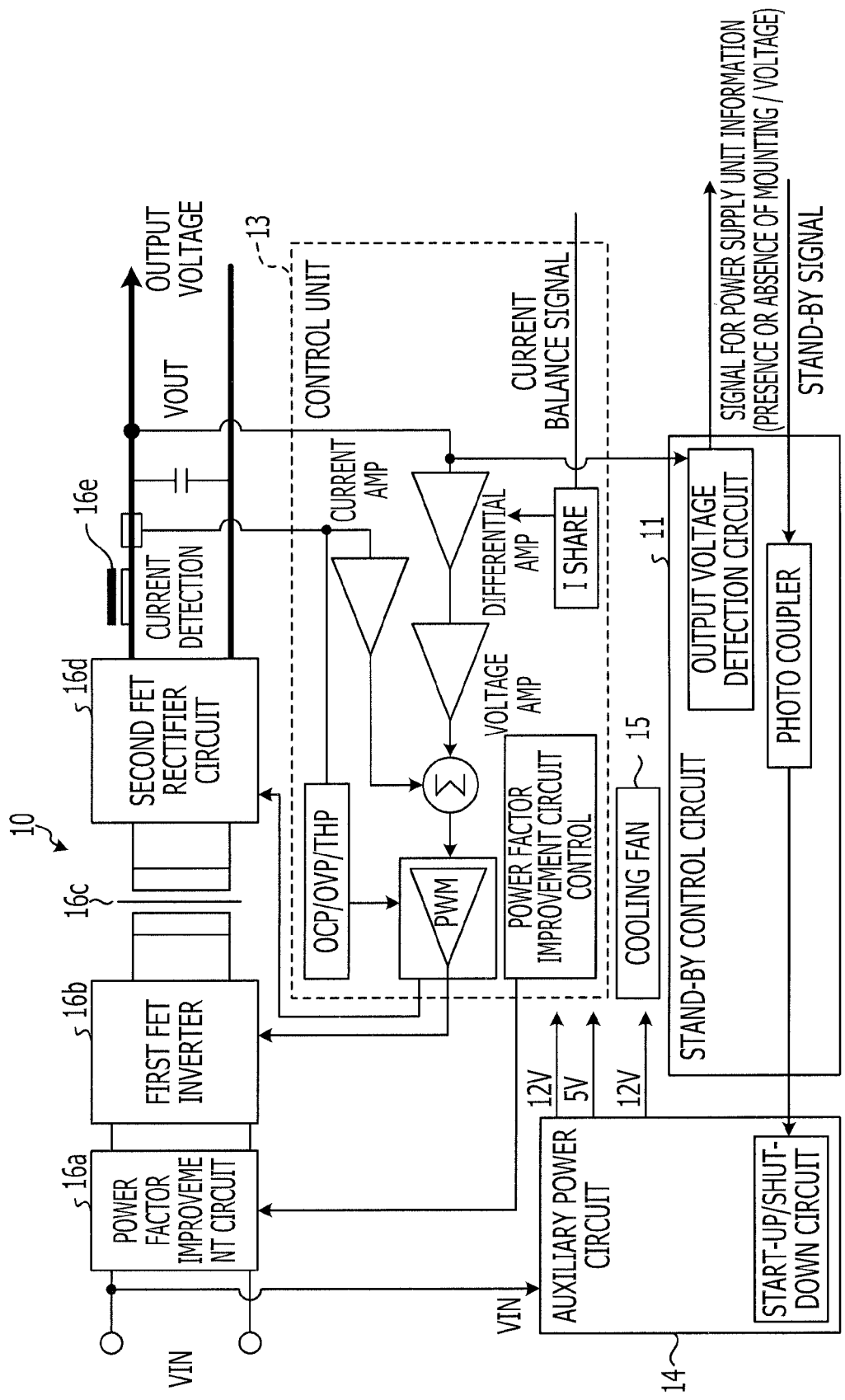
FIG. 4 is a diagram illustrating the configuration of a power supply unit of the present embodiment.

FIG. 4 is a schematic diagram illustrating the configuration of the power supply unit according to the present embodiment. As depicted in FIG. 4, a power supply unit 10 includes a stand-by control circuit 11, a control unit 13, an auxiliary power circuit 14, a cooling fan 15, a power factor improvement circuit 16a, a first field effect transistor (first FET) 16b, a transformer 16c, a second FET 16d, and a coil 16e.

An alternating current voltage Vin supplied from an AC power supply is output as a direct current output voltage Vout by passing through the power factor improvement circuit 16a, the first FET 16b, the transformer 16c, the second FET 16d, and the coil 16e.

In addition, the alternating current voltage Vin supplied from the AC power supply is converted into direct current voltage by the auxiliary power circuit 14 and then used for driving the control unit 13 and the cooling fan 15. The control unit 13 acquires the output of the output voltage Vout and then notifies the stand-by control circuit 11 of the acquired voltage. In addition, the control unit 13 amplifies the output voltage and the output current of the power supply unit 10 and then combines them together to generate a pulse subjected to pulse width modulation (PWM), which controls the first FET 16b served as an inverter and the second FET 16d served as a rectifier circuit.

In addition, the control unit 13 acquires a current balance signal from another power supply unit to use it for voltage amplification. In addition, the control unit 13 controls the power factor improvement circuit 16a. Specifically, if the own power supply unit is a master power supply unit, the control unit 13 outputs the output current level of the own power supply unit as a current balance signal to another power supply unit. If the own power supply unit is a slave power supply unit, "I SHARE" makes a comparison between the output current level of the own power current level and the level of the current balance level signal to control the amplification rate of the differential AMP, allowing the output current level of the own power supply unit to follow the level of the current balance signal. Furthermore, an over current protector (OCP), an over voltage protector (OVP), and a thermal protector (THP) in the control unit 13, which can be collectively referred to as OCP/OVP/THP, protects the own power supply unit by preventing it from overheating due to excessive output.

The control unit 13 receives a power supply of 12V and 5V from the auxiliary power supply unit 14. In addition, the cooling fan 15 receives a power supply of 12V from the auxiliary power circuit 14 to cool the power supply unit 10. The auxiliary power circuit 14 includes a start-up/shut-down circuit that switches between start-up and shut off of power supply to the control unit 13 and the cooling fan 15. The start-up/shut-down circuit is controlled by the stand-by control circuit 11.

When a waiting signal is input from the management unit 30 depicted in FIG. 1, the stand-by control circuit 11 detects a stand-by signal by a photo coupler and then controls the start-up/shut-down circuit to prevent the auxiliary power circuit 14 from supplying power to the control unit 13, thereby bringing the power supply unit 10 into a stand-by state. Here, the configuration of the present embodiment has been exemplified as one using a photo coupler as an electrically insulated switch element. Alternatively, any of other switches may be used instead of the photo coupler.

The operation of the control unit 13 and the cooling fan 15 are suspended while the power supply unit 10 is in the stand-by state and thus they have no power consumption. The stand-by control circuit 11 can continue its operation in response to power supply from the power supply unit if at least one of other power supply units connected in parallel is operating.

In addition, the stand-by control circuit 11 detects the value of output voltage Vout and then outputs the Vout as power supply unit information to the management unit 30. Thus, the management unit 30 can find whether the power supply unit 10 is mounted and whether the power supply unit is in operation state or in stand-by state if the power supply unit 10 is mounted.

Figure 5:
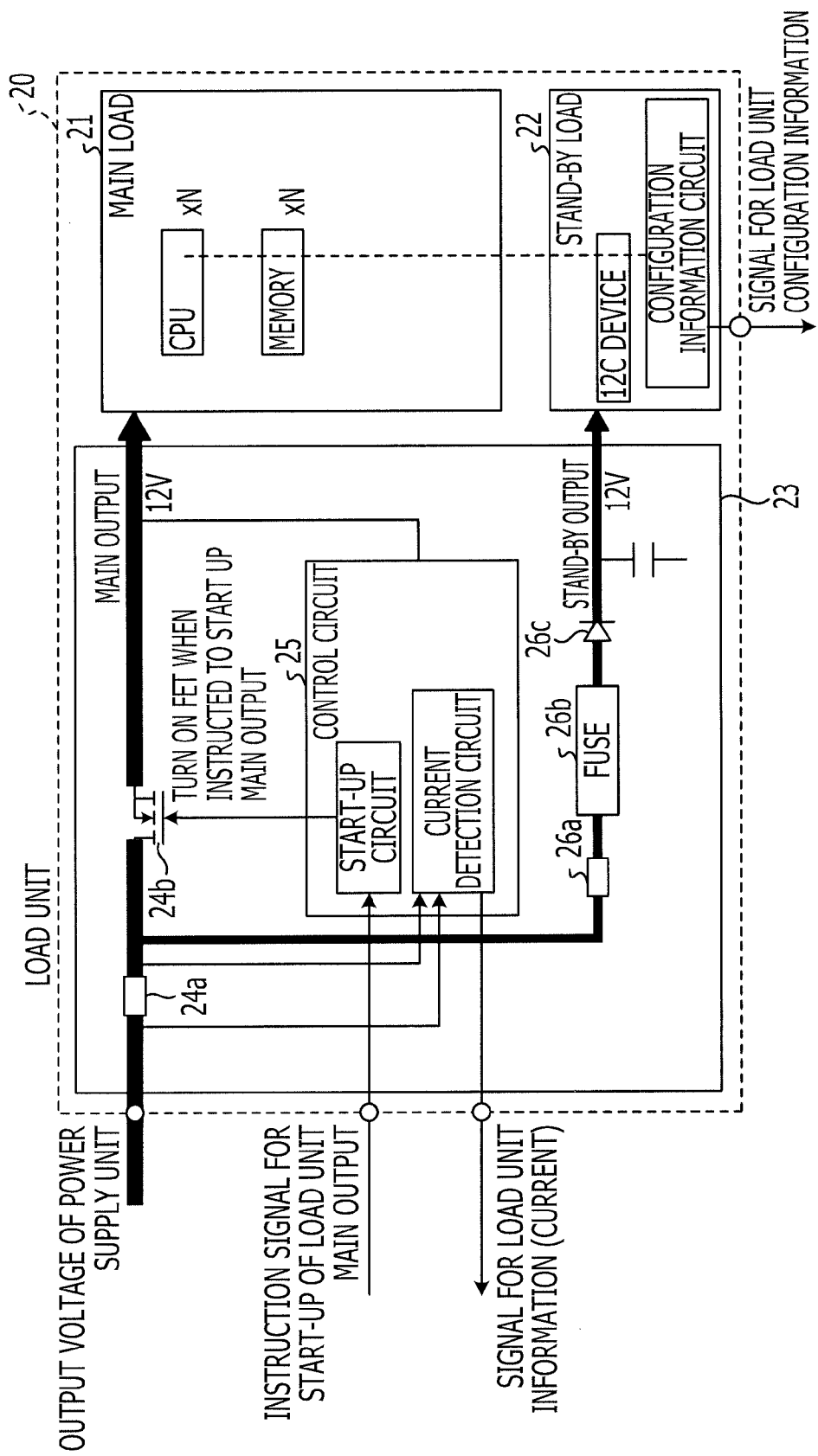
FIG. 5 is a schematic diagram illustrating the configuration of a load unit.

FIG. 5 is a schematic diagram illustrating the configuration of a load unit 20. The load unit 20 includes a main load 21, a stand-by load 22, and a dividing voltage supply circuit 23. The main load 21 is hardware, such as a CPU or a memory, which consumes power while working during the operation of the load unit 20. The numbers of CPUs and memories mounted on the load unit 20 may be arbitrary. The stand-by load 22 is hardware, such as a I2C (Inter-Integrated Circuit) device, which consumes power while working regardless of whether the load unit 20 is working. In addition, the stand-by load 22 includes a configuration information circuit. The configuration information circuit acquires the configuration information of the hardware, which belongs to each of the main load 21 and the stand-by load 22, and then outputs it as an information configuration signal of the load unit to the management unit 30.

The dividing voltage supply circuit 23 is branched into a main output and a stand-by output after permitting a voltage input from the power supply unit to pass through a current sense resistance 24a. The main output and the stand-by output are at 12V, respectively. Each of the main load 21 and the stand-by load 22 may include regulators if required. Thus, it can be used after converting the input voltage of 12V into a predetermined voltage.

A switch element 24b is arranged on the line on the side of the main output. The switch element 24b used may be, for example, a field effect transistor (FET). The control circuit 25 turns on/off the switch element 24b to switch on/off the supply of the main output to the main load 21. That is, it switches between the operating state and the stand-by state of the load unit 20. The control circuit 25 includes a start-up circuit and a current detecting circuit. The start-up circuit turns the switch element 24b into the on state when receiving a start-up instruction signal for main output of the load unit from the management unit 30. In addition, the current detecting circuit acquires the voltage between the both terminals of the current sense resistance 24a and then calculates a current value, followed by outputting the current value as load unit information to the management unit 30.

On the other hand, a resistor 26a, a fuse 26b, and a diode 26c are arranged on the line on the side of the stand-by output to output a stand-by output to the stand-by load 22. As long as electric power is supplied from the power supply unit to the load unit 20, the stand-by output is supplied to the stand-by unit 22 even if the load unit 20 is in the operating state or the stand-by state.

Figure 6:
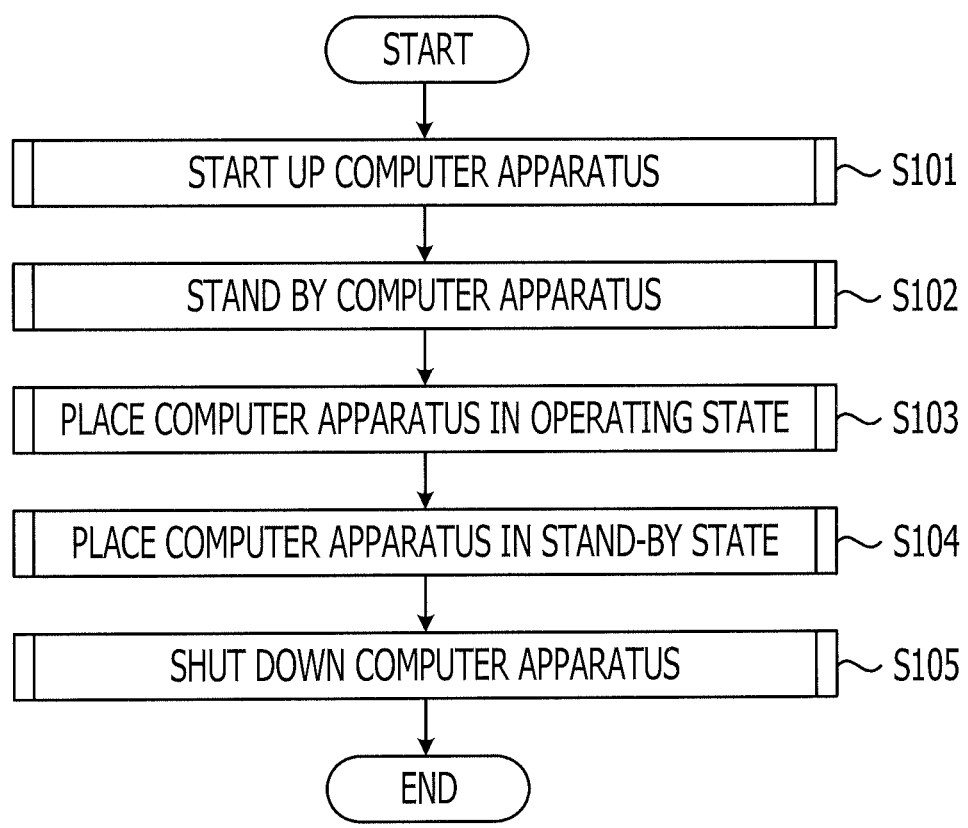
FIG. 6 is a flow chart illustrating the processing operation of the computer apparatus 1.

FIG. 6 is a flow chart illustrating the processing operation of the computer apparatus 1. The computer apparatus 1 performs start-up processing (S101) and then performs a stand-by processing (S102) to enter the operating state (S103). Subsequently, if there is a shut-off instruction from the user, then the computer apparatus 1 is switched from the operating state to the stand-by state (S104) and then shut down (S105).

Figure 7:
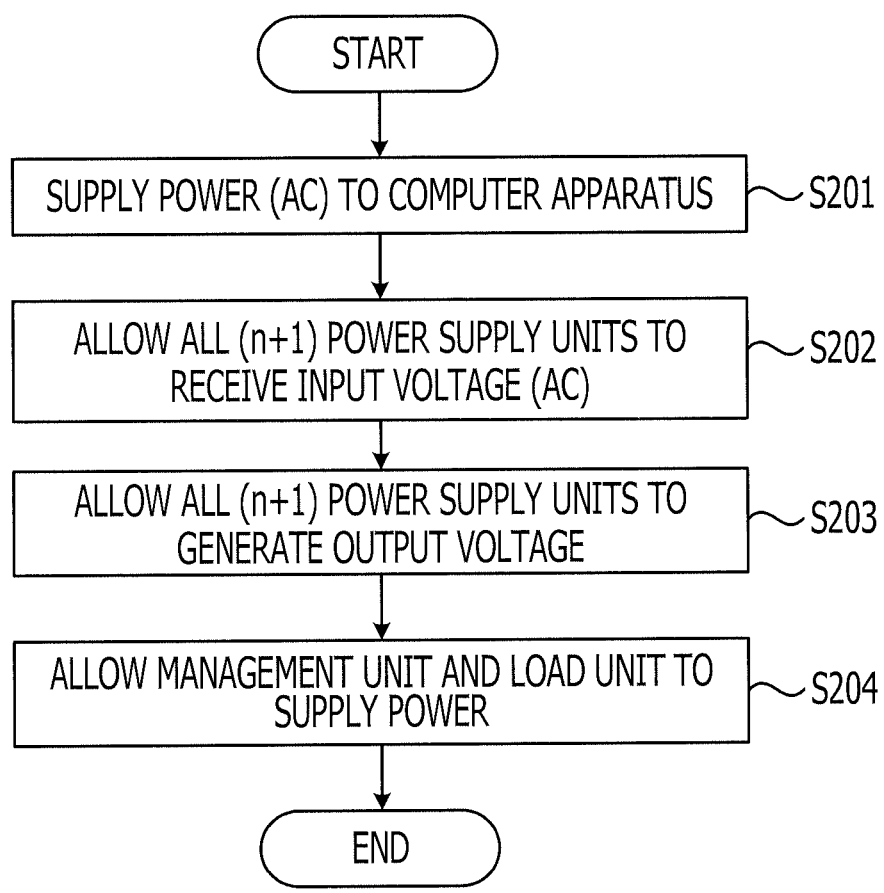
FIG. 7 is a flow chart illustrating the start-up processing (S101) of the computer apparatus 1.

FIG. 7 is a flow chart illustrating the start-up processing (S101) of the computer apparatus 1. If an AC voltage is applied as an input voltage to the computer apparatus 1 (S201), all of "n+1" power supply units 10, or power supply units 10_1 to 10_20_n+1, receive the AC voltage (S202). Subsequently, each power supply unit 10 that has received the AC voltage outputs a single output voltage (S203) to supply electric power to the management unit 30 and a plurality of the load units 20 (S204). After the processing in S204, the computer apparatus ends its start-up processing and then performs the stand-by processing.

The outputs of the respective power supply units 10 are connected to one another in parallel. The total current output from the power supply units connected to one another is supplied to each part of the computer apparatus 1, allowing the supply of consumption power at the time of the maximum operation of the management unit 30 and the maximum operation of a plurality of load units 20. Furthermore, by providing the power supply units as many as those that are able to supply consumption power at the maximum operation with one additional power supply unit, a plurality of the power supply units can be operated redundantly.

The management unit 30 is activated by the power supply from the power supply unit 10 and then performs the stand-by processing of the computer apparatus (S102). In step S102, the management unit 30 manages the operation of the power supply unit 10 and the load unit 20.

Figure 8:
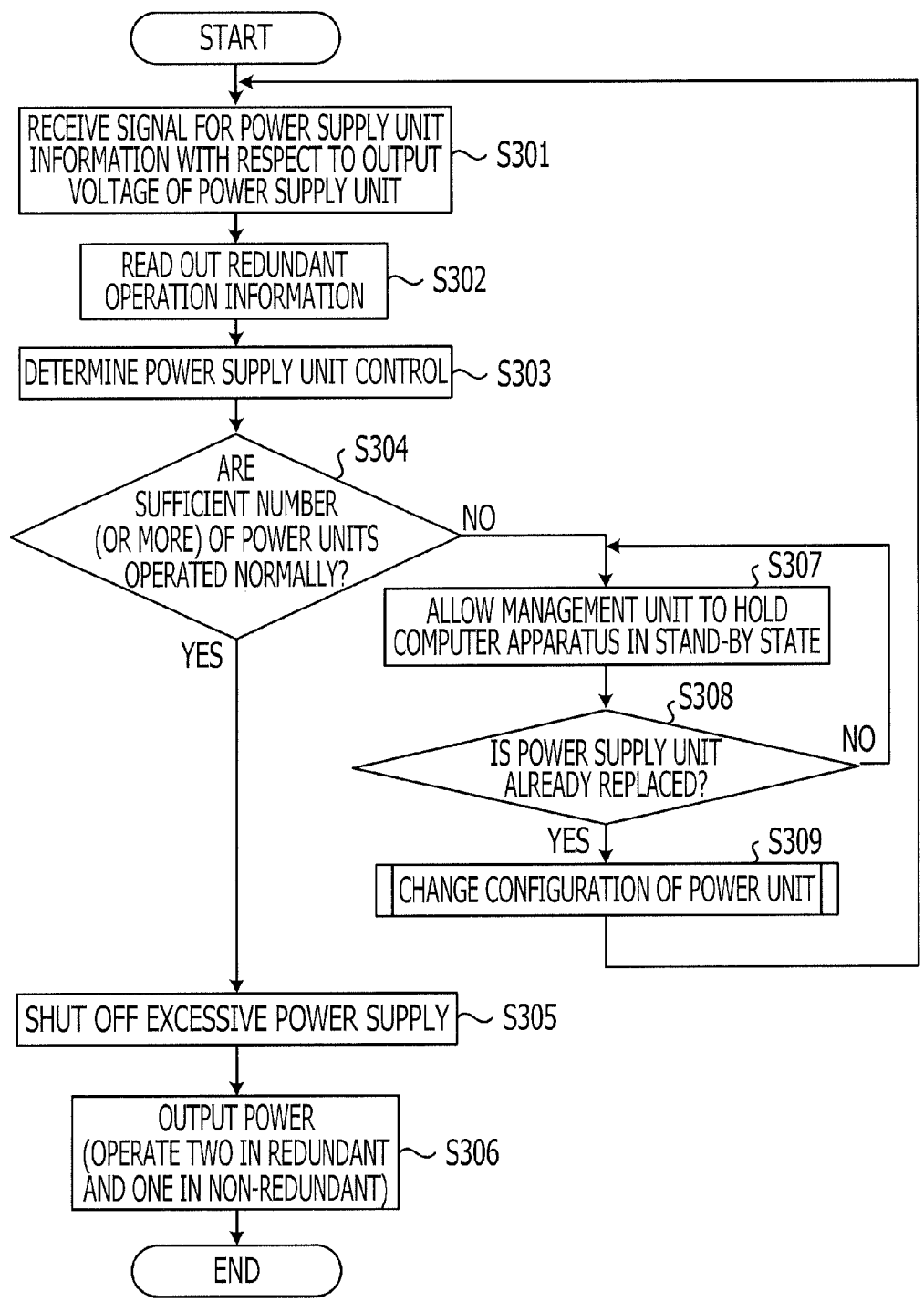
FIG. 8 is a flow chart illustrating a method for managing a power supply unit in the stand-by state at start-up.

FIG. 8 is a flow chart describing a method for managing a power unit in the stand-by processing at start-up. In FIG. 8, the management is performed by the management unit 30. The management unit 30 receives a signal that represents an output voltage as information about the power supply unit from a plurality of the power supply units 10 (S301). In addition, the management unit 30 reads out redundant operation information from the redundant-setting register 33 (S302) and then makes a judgment about the control of the power supply units (S303).

In the judgment of the control of the power supply units in step S303, the management unit 30 makes a comparison between the number of the power supply units which are working normally and the number of the power supply units which are required for the power supply. FIG. 9 is an explanatory diagram illustrating the judgment of the control of the power supply unit. The management unit 30 confirms whether each of the power supply units 10 outputs a voltage normally with reference to the power supply unit information obtained from the respective power supply units 10. Using this power supply unit information, the management unit 30 can confirm the number of the power supply units mounted.

In addition, the management unit 30 determines the number of the power supply units used in the stand-by state with reference to the redundant operation information. In the example depicted in FIG. 9, there are two power supply units to be used if the redundant operation thereof is specified using the redundant operation information. In contrast, there is one power supply unit to be used if the non-redundant operation thereof is specified. Furthermore, FIG. 9 illustrates the exemplary case where a stand-by voltage can be supplied to all the loads using only one power supply unit. Alternatively, however, two or more power supply units may be used in non-redundant operation.

In the example depicted in FIG. 9, the management unit 30 determines that a sufficient number of the power supply units are operated normally as long as two or more power supply units are normally operated in redundant operation.

Referring back to FIG. 8, as a result of the determination in step S303, the power supply units as many as or more than those required for the desired power supply are not working normally ("NO" in S304), or the number of the power supply units in normal operation is insufficient, then the operation unit 30 holds the computer apparatus 1 in the stand-by state (S307). The computer apparatus 1 is kept in the stand-by state until the replacement of power supply units is performed ("NO" in S308). Then, if the power supply unit is replaced with new one ("YES" in S308), then the management unit 30 performs a procedure for changing the configuration of the power supply unit (S309). Subsequently, the process returns to step S301. The details of the procedure for changing the configuration of the power supply unit will be described later.

As a result of the determination in step S303, if the number of the power supply units which are working normally is equal to or more than one sufficient to supply power ("YES" in S304), then the management unit 30 shuts off excessive power supply (S305), outputs power from the power supply unit in operation (S306), and ends the stand-by processing of the power supply unit. Specifically, if the management unit 30 is being set to perform the non-redundant operation of the power supply unit, only one of the power supply units 10 which are working normally is kept working while all the others were shut down. In addition, if the management unit 30 is being set to perform the redundant operation of the power supply unit, only two of the power supply units 10 which are working normally is kept working while all the other power supplies are shut down. The management unit 30 outputs a stand-by signal to the power supply unit 10 to be shut off at the time of shutting down the power supply unit 10.

The power supply unit 10 shuts off the power supply when receiving the stand-by signal from the management unit 30, while the stand-by power cut-off control circuit 11 in the power supply unit 10 shuts off the internal power supply of the auxiliary power circuit 14 or the like in the power supply unit. The shut-off of the internal power supply leads to the absence of power supply to the control unit 13 and so on in the power supply unit, causing a state of substantially no consumption of electric power in comparison with the steady state.

Figure 10:
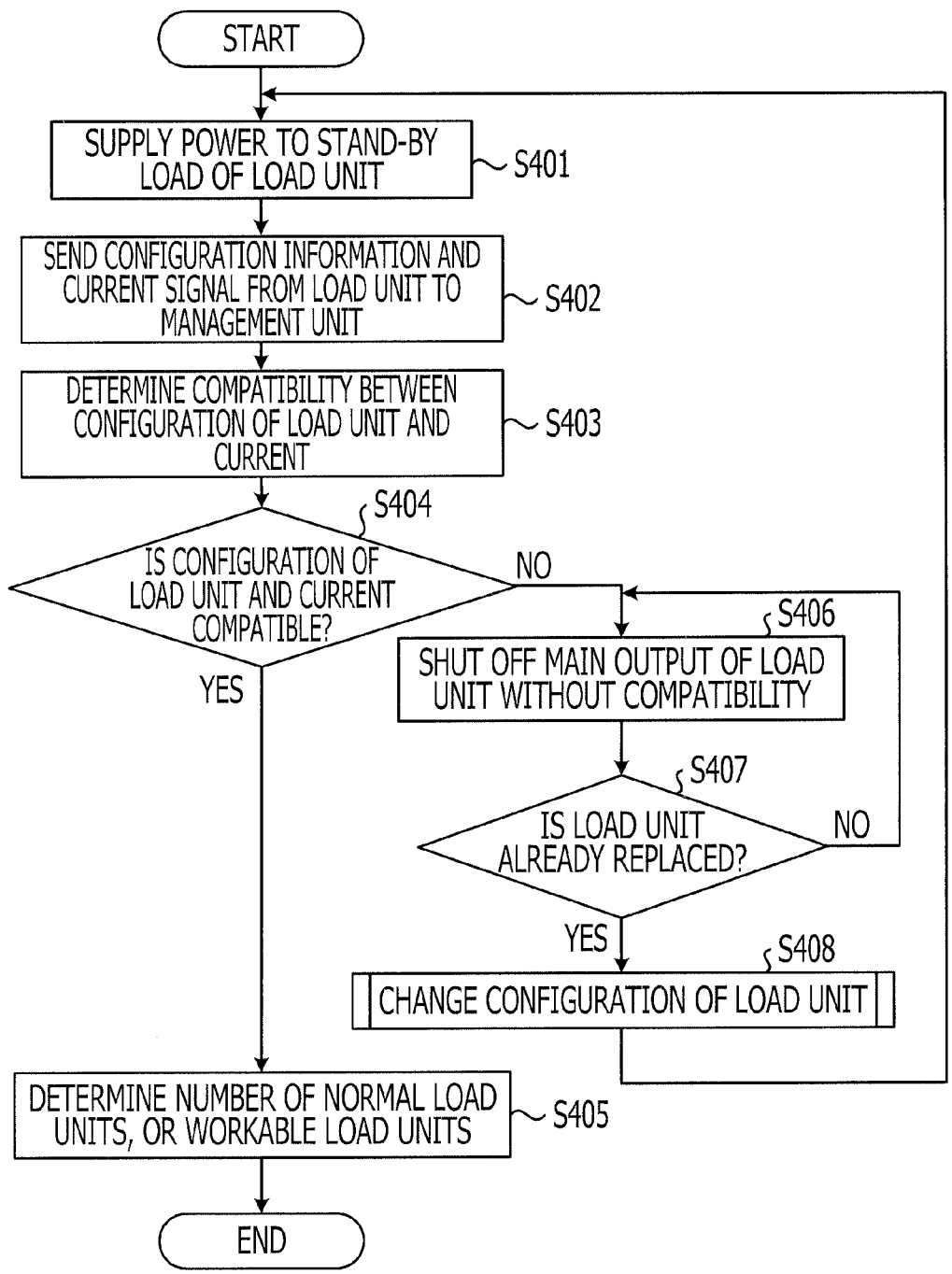
FIG. 10 is a flow chart describing the management of a load unit in the stand-by state at start-up.

FIG. 10 is a flow chart describing the management of a load unit in the stand-by processing at start-up. A plurality of load units 20, such as load units 20_1 to 20_n, receive the power supply from the power supply unit 10 (S401) and then allow the dividing voltage supply circuit 23 to divide the output voltage of the power supply unit 10 into main output and stand-by output.

The main output is provided for supplying electric power to the internal components, such as the CPUs, the memories, and various kinds of IO, in the load unit 20. In the initial state, the main output is shut-off by the dividing voltage supply circuit 23. Thus, the power consumption of the main output in the load unit 20 is zero Watt (0 W). The main output is output from the dividing voltage supply circuit 23 when the computer apparatus described below is in the operating state and then supplied to the CPUs, the memories, and the various kinds of IO.

The stand-by output is provided for supplying electric power to the configuration information circuits of the load unit 20 and various devices that always require electric supply. The stand-by output is always output during the period from the initial state to the operating state of the power supply unit. In addition, the power consumption of the stand-by load to which the stand-by output is supplied is small as much as, for example, several percent of the power consumption of the whole load unit.

The configuration information circuit, which has received the stand-by output, monitors various conditions of the load units. Examples of such conditions include: the numbers of CPUs, memories, various kinds of IO, and so on mounted on the load unit; and the state of whether the load unit is being normal or broken down. Then, the configuration information circuit outputs a monitoring result to the management unit 30. That is, the monitoring result is provided as an information signal about the configuration of the load unit 20 (hereinafter, simply referred to as "configuration information"). Preferably, both the condition monitoring and the configuration information output may be periodically performed. In addition, the load unit 20 outputs a load unit information signal (hereinafter, referred to as a "current signal") to the management unit 30 (S402).

The management unit 30 receives both configuration information and current signals from a plurality of the load units 20. Then, the management unit 30 confirms whether each of the load units 20 normally receives the current or confirms how many components are mounted on the load unit. Subsequently, the management unit 30 determines the compatibility between the configuration of the load unit and the current-supplying ability of the power supply unit (S403).

FIG. 11 is an explanatory diagram illustrating the determination of the compatibility between the configuration of the load unit and the current-supplying ability of the power supply unit. The configuration information from the load unit represents the state of the load unit, the numbers of the components, such as CPUs, the MEMs, and IOs, mounted on the load unit. In the example depicted in FIG. 11, a first load unit 1 is in the stand-by state, on which two CPUs, 16 MEMs, and four IOs are mounted. Likewise, a second load unit 2 is in the stand-by state, on which one CPU, eight MEMs, and four IOs are mounted.

In the example depicted in FIG. 11, the current value represented by current signals from the load unit is one ampere (1 A) for the first load unit and one ampere (1 A) for the second load unit.

For example, the management unit 30 retains the correspondence between the configuration unit and the expected value of consumption current at the time of manufacturing the computer apparatus. In the example depicted in FIG. 11, the load unit 20 depicts an expected current value of one ampere (1 A) when the load unit 20 is in the stand-by state. In addition, if the load unit 20 is in the operating state, the load nit 20 depicts an expected current value of 10 amperes (10 A) per CPU, 0.5 amperes (0.5 A) per MEM, and one ampere (1 A) per IO.

Referring back to FIG. 10, if the result of the determination in step S403 depicts that there is no compatibility between the configuration of the load unit and the current-supplying ability of the power supply unit ("NO" in S404), then the management unit 30 shuts off the main output to the load unit 20 with insufficient current-supplying ability (S406). Here, the term "compatibility" between the configuration of the load unit and the current-supplying ability of the power supply unit means that the current-supplying ability of the power supply unit is sufficient for the configuration of the load unit. The shut off of the main output continues until the corresponding load unit 20 is replaced with new one ("NO" in S407). If the load unit 20 is replaced ("YES" in S407), the management unit 30 performs the procedure for changing the configuration of the power supply unit (S408). Then, the process returns to step S401. The details of the procedure for changing the configuration of the power supply unit will be described later.

On the other hand, as a result of the determination in step S404, if there is the compatibility between the configuration of the load unit and the current ("YES" in S404), the management unit 30 determines the number of normal load units, or the number of the workable load units (S405). Then, the stand-by processing of the load units is completed. The load units enter the operating state.

Figure 12:
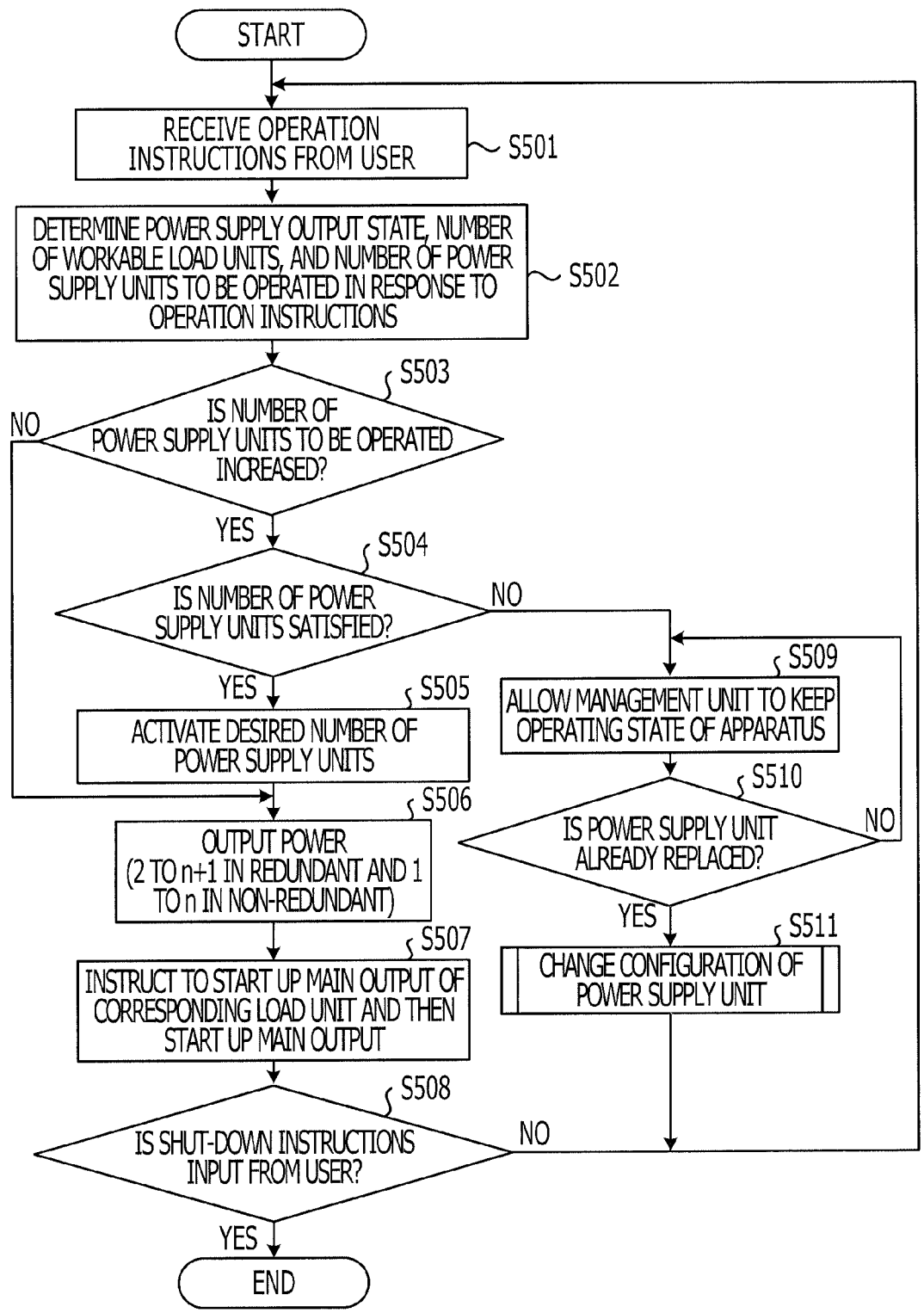
FIG. 12 is a flow chart illustrating the computer apparatus in the operating state (S103)

FIG. 12 is a flow chart illustrating processing performed in the computer apparatus in the operating state (S103). If the computer apparatus 1 in the operating state receives instructions from the user (S501), then the management unit 30 determines the number of power supply units to be operated based on the state of current output, the number of workable load units, and operation instructions (S502).

FIG. 13 is an explanatory diagram illustrating the control of determining the number of power supply units. For each of "n" load units, operation instructions of whether each of "n" load units is in the stand-by state or in the operating state are input into the computer apparatus 1. In the example depicted in FIG. 13, the number of power supply units available to be used as a power supply is 2 to n+1 in redundant operation and 1 to n in non-redundant operation. If the number of load units is three and all the load units are instructed to be stand-by, two power supply units operate in the redundant operation, which is the minimum number thereof in the non-redundant operation and one power supply unit operates in the redundant operation, which is the minimum number thereof in the non-redundant operation (Example 1). Furthermore, if the number of load units is three and two of them is instructed to be operated and the rest is instructed to be stand-by, three power supply units operate in the redundant operation, where one redundant power supply unit is added to the power supply units corresponding to the number of the load units in operation, and two power supply units operate in the non-redundant operation, where the number of the power supply units is equal to the number of the load units in operation (Example 2).

Referring back to FIG. 12, as a result of step S502, when increasing the number of power supply units to be operated ("YES" in S503), the management unit 30 determines whether the number of the power supply units 10 to be normally operated is sufficient to increase the number of power supply units (S504). If the number of the power supply units 30 is insufficient ("NO" in S504), the management unit 40 keeps the operating state of the computer apparatus 1 at the time (S509), while waiting the replacement of the power supply unit (S510). Furthermore, if the power supply unit is replaced ("YES" in S510), the management unit 30 performs the procedure for changing the configuration of the power supply unit (S511). Then, the process returns to step S501

On the other hand, if the number of the power supply units is sufficient ("YES" in S504), then the management unit 30 turns on the power supply units as many as those required for increasing the number of power supply units to be operated (S505). After step S505, or when not increasing the number of power supply units to be operated ("NO" in S503), the management unit 30 outputs power from the power supply unit in operation (S506) and the main output of the corresponding load unit 20 is then instructed to be started up to initiate the load unit (S507). Here, the number of operation devices 10 is 2 to n+1 in the redundant operation and 1 to n in the non-redundant operation. The number of the load units 20 to be operated is one less than the number of the power supply units 10 in operation in the redundant operation and equal to the number of the power supply units 10 in operation in the non-redundant operation.

After step S507, if the shut-off instruction is received from the user ("YES" in S508), the management unit 30 ends the operating state and then shifts to the stand-by state before the shut-off. On the other hand, if there is no shut-off instruction from the user ("NO" in S508), the management unit 30 returns the process to step S501 to continue the operating state.

Figure 14:
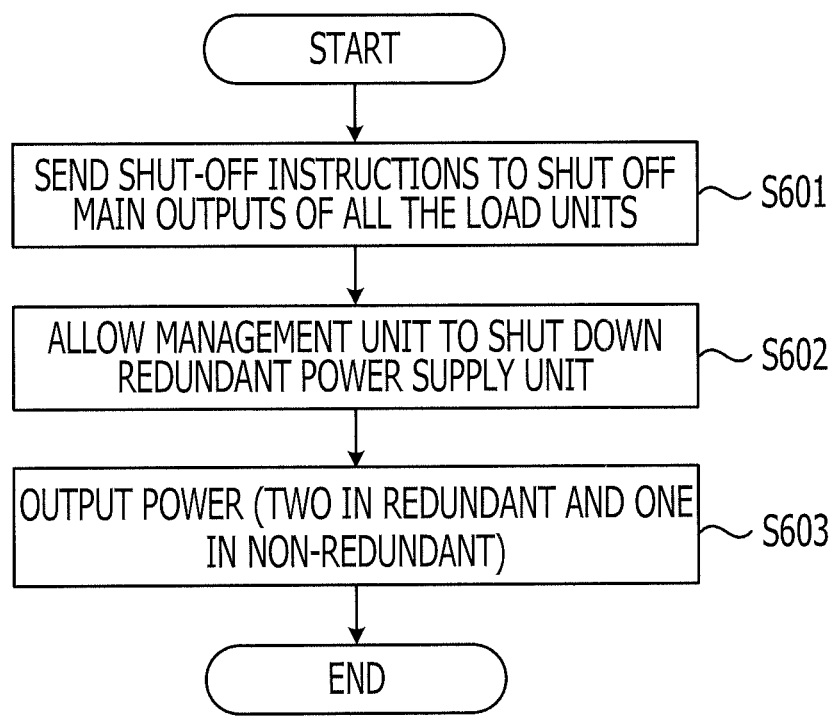
FIG. 14 is a flow chart illustrating the stand-by operation before shutting down the computer apparatus 1 (S104)

FIG. 14 is a flow chart illustrating the stand-by operation before shutting down the computer apparatus 1 (S104). The computer apparatus 1 that has entered in the stand-by state before the management unit 30 turns off the main outputs of all the load units 20 to shut off all the load units 20 (S601).

After all the load units 20 have stopped, the management unit 30 turns off the redundant power supply unit (S602) and then outputs electric power from the rest of the power supply units (S603). Thus, the stand-by processing is ended and shifted to the shut off processing. At this time, it becomes the state where two power supply units operate in the redundant operation and one power supply unit operates in the non-redundant operation.

Figure 15:
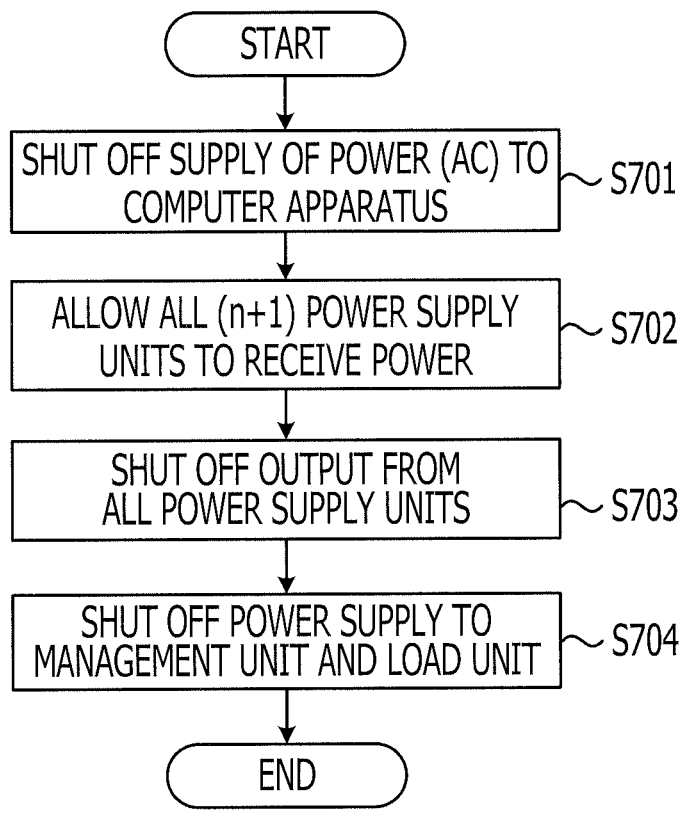
FIG. 15 is a flow chart illustrating the shut-off operation of the computer apparatus 1 (S105)

FIG. 15 is a flow chart illustrating the shut-off operation of the computer apparatus 1 (S105). The computer apparatus 1 that has shifted to the shut-off operation stops the supply of AC power to the computer apparatus 1 (S701). Therefore, all of "n+1" power nits 10 stops power receiving (S702) and all of the power supply units 10 stops voltage output (S703). Then, the power supply to the management unit 30 and the load unit 20 are stopped (S704) and the computer apparatus 1 is then shut off.

Figure 16:
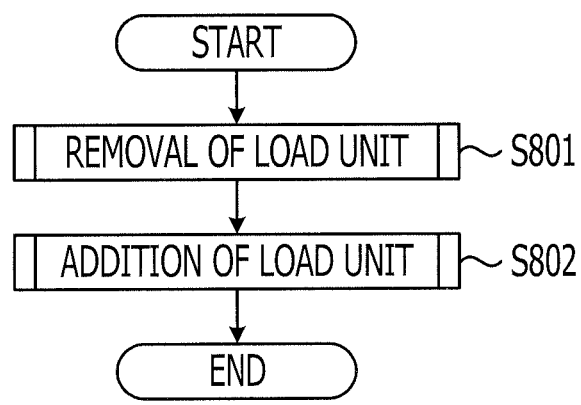
FIG. 16 is a flow chart illustrating the procedure for changing the configuration of a load unit.

FIG. 16 is a flow chart illustrating the procedure for changing the configuration of a load unit. In the procedure for changing the configuration of the load unit, the management unit 30 performs the procedure for removing the load unit (S801) and then performs the processing of adding an alternate load unit (S802), followed by ending the process. The details of both the procedure for removing the load unit (S801) and the processing of adding the alternate load unit (S802) will be described in detail.

Figure 17:
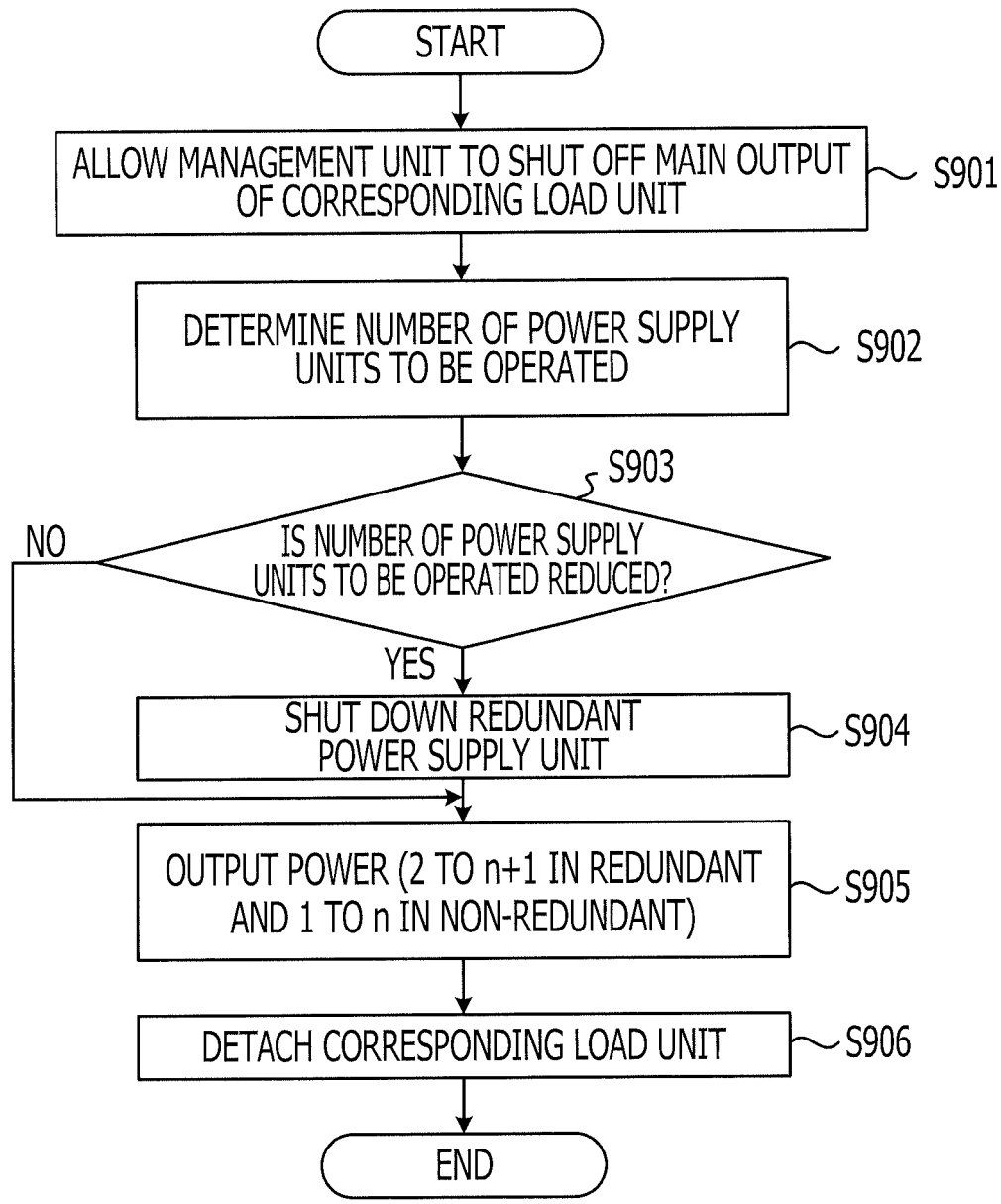
FIG. 17 is a flow chart illustrating the procedure for removing a load unit (S801)

FIG. 17 is a flow chart of the procedure for removing the load unit (S801). The management unit 30 that starts to the procedure for removing the load unit shuts off the main output of the load unit to be removed (S901) and then determines the number of the electric powers to be operated (S902). The number of the power supply units determined by step S902 ranges from 2 to n+1 in the redundant operation and from 1 to n in the non-redundant operation.

For example, there are three load units. A first load unit in operation may be removed. A second load unit in operation and a third load unit in the stand-by state may be remained. In this case, the number of power supply units decreases from three to two in the redundant operation and from two to one in the no-redundant operation (Example 1). In addition, if the load unit to be removed is in the stand-by state, the states of other load units remain as they are. Thus, there is no decrease in number of the power supply units.

As a result of step S902, if the number of the power supply units to be activated is decreased ("YES" in S903), then the management unit 30 shuts down the redundant power supply units (S904). After step S904, or when the number of the power supply units to be activated is not decreased ("NO" in S903), the management unit 30 allows each power supply unit 10 in operation to output voltage (S905). Under such conditions, hot-removal is performed by detaching the load unit to be removed (S906).

Figure 18:
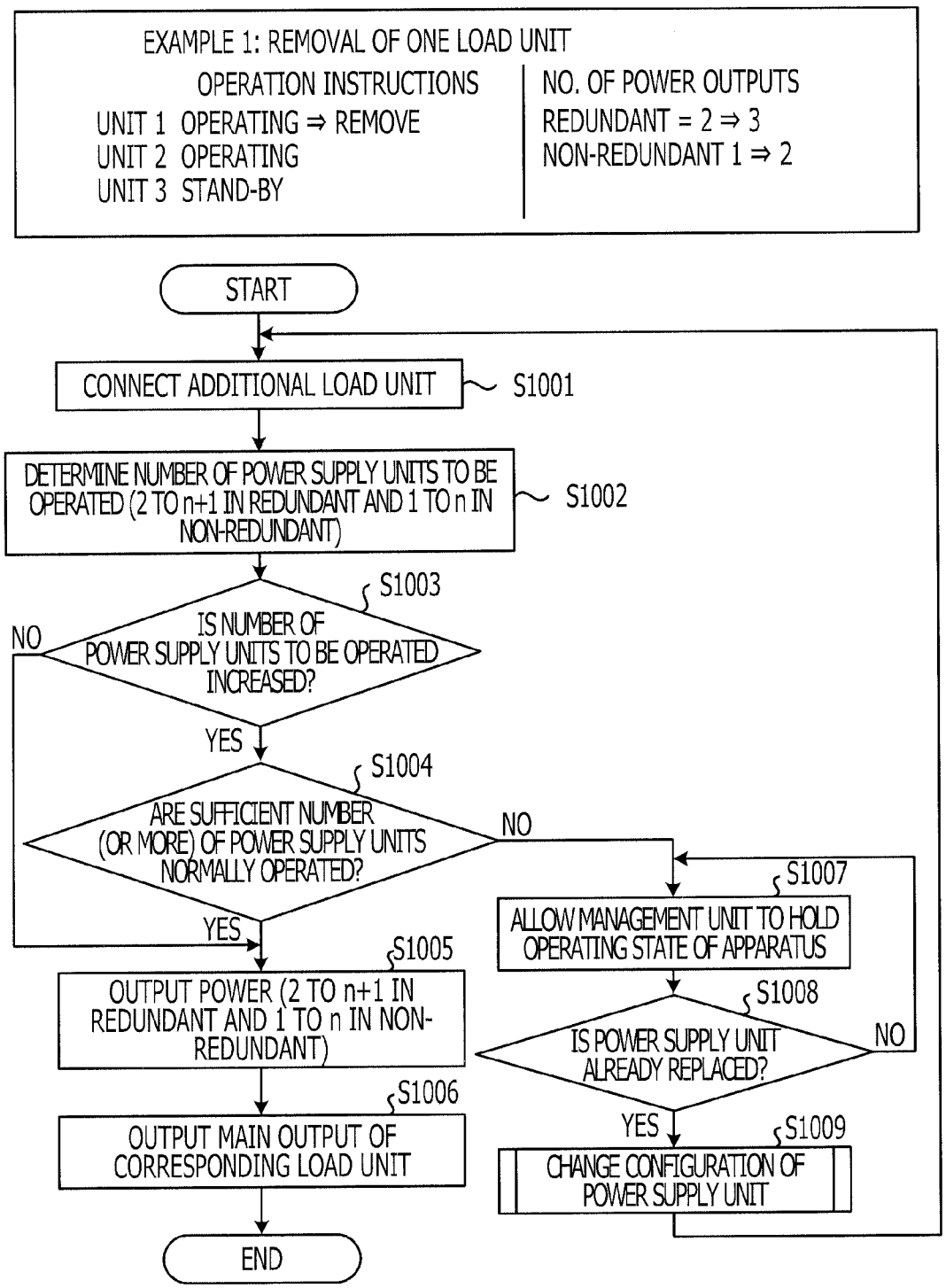
FIG. 18 is a flow chart illustrating the procedure for adding a load unit (S802)

FIG. 18 is a flow chart illustrating the procedure for adding a load unit (S802). In the procedure for adding a load unit, first, an additional load unit 20 is connected to the computer apparatus 1 (S1001). The management unit 30 acquires configuration information from each load unit and then determines the number of power supply units to be activated (S1002). The number of power supply units to be determined in step S1002 is in the range of 2 to n+1 in the redundant operation and 1 to n in the non-redundant operation.

For example, if there are three power supply units, where a first one which has been removed is additionally installed and activated and both a second one which is currently working and a third one which is in the stand-by state remain as they are, the number of the power supply units is increased from two to three in the redundant operation and from one to two in the non-redundant operation (Example 1). Furthermore, if the added load unit is brought into the stand-by state, the number of the power supply units is not increased.

As a result of step S1002, if the number of the power supply unit to be activated is increased ("YES" in S1003), then the management unit 30 determines whether the number of the power supply units 10 which are normally working is not less than the number thereof for satisfying the power supply to the configuration of the load unit (S1004). If the number of the power supply unit 10 is insufficient ("NO" in S1004), then the management unit 30 retains the operating state of the computer apparatus 1 at the time (S1007) and waits for the replacement of the power supply unit (S1007). Subsequently, if the power supply unit is replaced with a new power supply ("YES" in S1008), then the management unit 30 performs the procedure for changing the configuration of the power supply unit (S1009). After that, the process returns to step S1001.

On the other hand, if the number of the power supply units is sufficient ("YES" in S1004) or there is no increase in number of the power supply units ("NO" in S1003), then the management unit 30 activates a required number of the power supply units to output electric power (S1005). Subsequently, the management unit 30 activates the additional load unit by instructing the power supply unit to start up main output to the additional load unit 20 (S1006) to complete the hot-plugging of the load unit. Here, the number of the power supply units 10 to be activated is in the range of 2 to n+1 in the redundant operation and 1 to n in the non-redundant operation.

The above processing can change the configuration of the load unit 20 by hot-removal and hot-plugging of the load unit 20, while allowing the computer apparatus 1 to be kept working. For example, if failure has occurred in the load unit 20 by short circuit, then the management unit 30 shuts off the main output from the dividing voltage supply circuit 23 of the short-circuit load unit. The load circuit failed by the short circuit is deactivated and detached from the computer apparatus. Therefore, it becomes possible to prevent the power supply from decreasing and continue the normal operation of other load units. Furthermore, in response to a change in configuration of the load unit 20, the management unit 30 shuts off the power supply unit depending on the power required after the configuration change. If the required power can be already supplied using the power supply units currently present, the previous state is maintained and the number of the power supply units to be activated is not changed. The dividing voltage supply circuit 23 may include an over-current protection mechanism which detects the over-current at the time of short circuit failure of the load unit 20 and shut off the main output by itself. In this case, shut off instructions from the management unit 30 allows the load unit 20 failed by short circuit from being protected from restarting.

Figure 19:
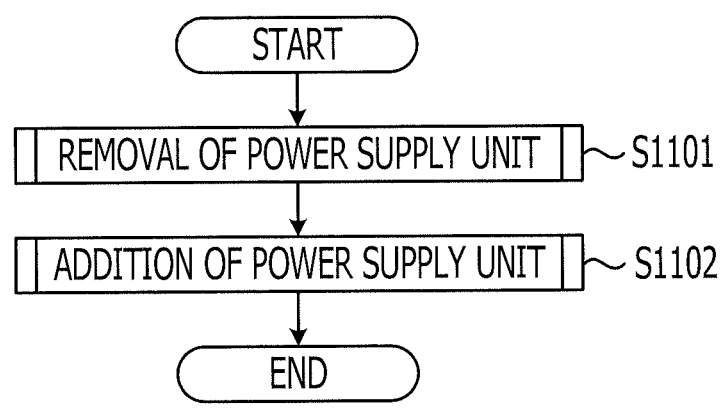
FIG. 19 is a flowchart illustrating the procedure for changing the configuration of a power supply unit.

FIG. 19 is a flowchart illustrating the procedure for changing the configuration of a power supply unit. In the procedure for changing the configuration of the power supply unit, the management unit 30 performs the procedure for removing the power supply unit (S1101) and then performing the procedure for adding another power supply unit (S1102), followed by ending the processing. The details of the procedure for removing the power supply unit (S1101) and the procedure for adding another power supply unit (S1102) will be described, respectively.

Figure 20:
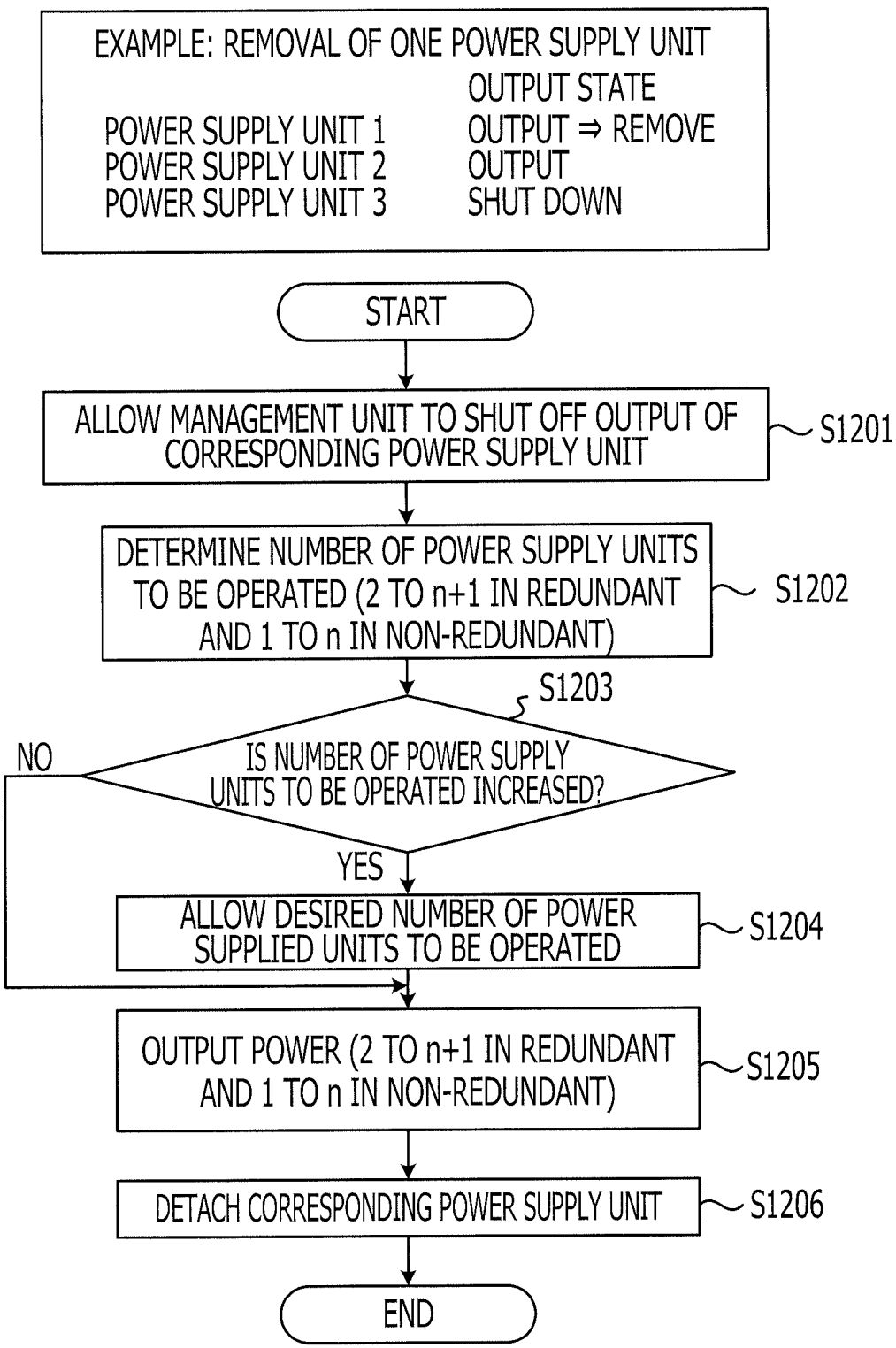
FIG. 20 is a flow chart illustrating the procedure for removing a power supply unit (S1101)

FIG. 20 is a flow chart illustrating the procedure for removing the power supply unit (S1101). The management unit 30 that has begun the procedure for removing the power supply unit shuts off the output of the power supply unit to be removed (S1201) and then determines the number of the power supply units to be activated (S1202). The number of the power supply units determined by step S902 ranges from 2 to n+1 in the redundant operation and from 1 to n in the non-redundant operation.

For example, if there are three power supply units, where a first one which has been output voltage is removed and both a second one which is currently outputting voltage and a third one which is being shut off remain as they are, the number of the power supply units to be activated is decreased from two to one, for example. In addition, if the power supply unit to be removed is being shut off, then the number of the power supply units in operation is retained.

As a result of step S1202, if the power supply unit is newly activated, or any of other power supply units which have been shut off is activated in replace of the working power supply unit to be removed ("YES" in S1203), then the management unit 30 activates the power supply units as many as those required (S1204).

After step S1204, or when the number of the power supply units in operation does not decrease and there is no need of newly activating the power supply unit ("NO" in S1203), the management unit 30 outputs voltage from each power supply unit 10 (S1205) and then supplies electric power to the load unit. Under such conditions, hot-removal is performed by detaching the power supply unit 10 to be removed (S1206).

Figure 21:
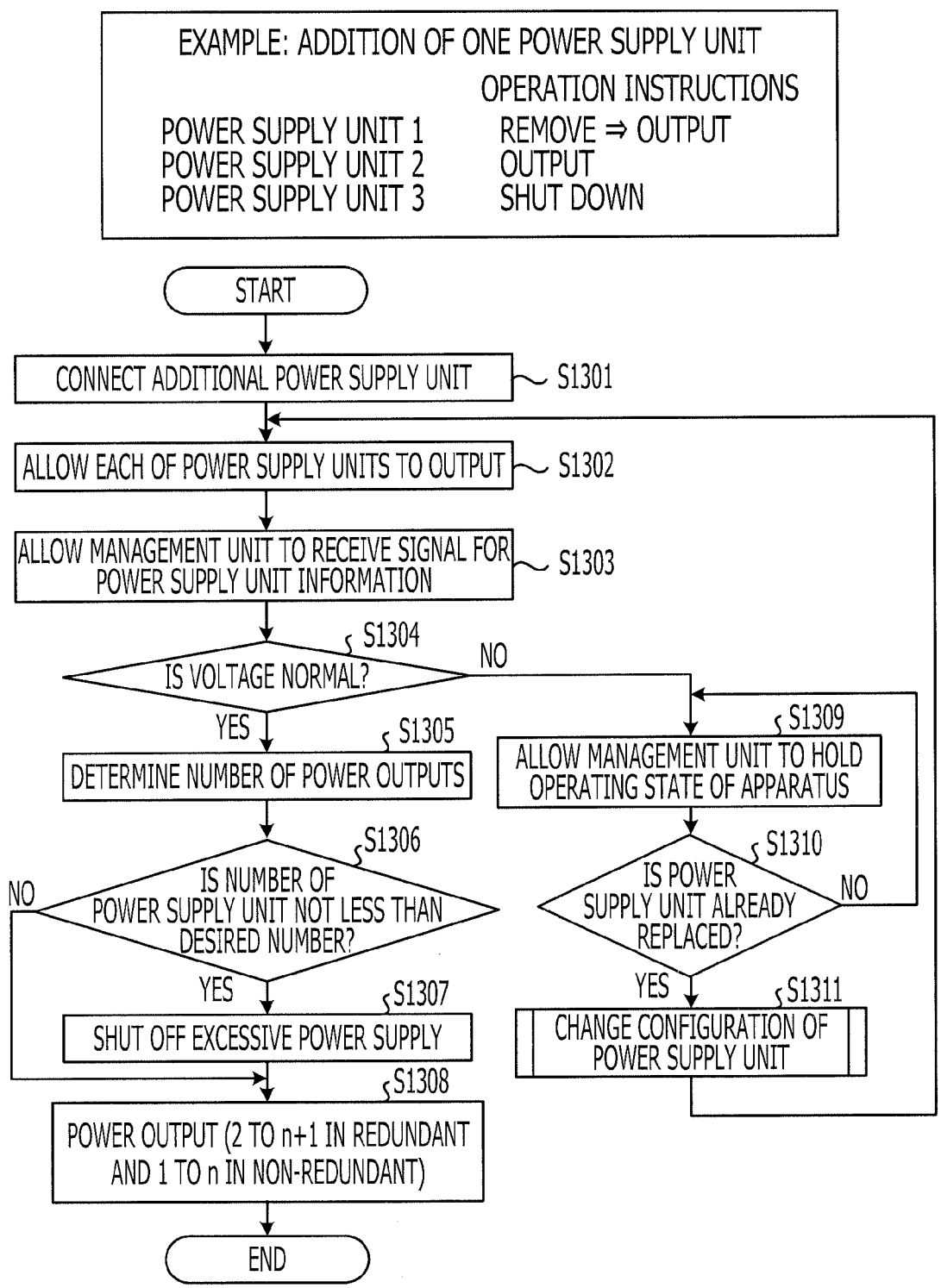
FIG. 21 is a flow chart illustrating the procedure for adding a power supply unit (S1102)

FIG. 21 is a flow chart illustrating the procedure for adding a power supply unit (S1102). In the procedure for adding a power supply unit, first, an additional power supply unit 10 is connected to the computer apparatus 1 (S1301). The added power supply unit 10 is activated by receiving AC power and then outputs voltage, while outputting power device information to the management unit 30. Similarly, voltage is also output to other power supply units which has been already connected and kept working, while power supply unit information is output to the management unit 30 (S1302).

The management unit 30 acquires power supply unit information from each power supply unit 10. Then, the management unit 30 determines whether a voltage level represented by each power supply unit is normal (S1304). If there is power supply unit information that represents an abnormal voltage level ("NO" in S1304), the management unit 30 retains the operating state of the computer apparatus 1 at the time (S1309) and waits for the replacement of the power supply unit 10 outputting an abnormal voltage. Furthermore, if the power supply unit with abnormal voltage is replaced ("YES" in S1310), the management unit 30 performs the procedure for changing the configuration of the power supply unit (S1311). Then, the process returns to step S1302.

On the other hand, if all the voltage levels represented by the power supply unit information is normal ("YES" in S1304), the number of power outputs is determined (S1305). The management unit 30 determines whether the number of the power supply units in operation is larger than the number of the power supply units required (S1306). If the number of the power supply units in operation is larger than the number of the power supply units required (Yes in "S1307"), the management unit 30 shuts off excessive power supply (S1307). After step S1307, or when the number of the power supply units in operation exceeds the number thereof required ("NO" in S1306), the management unit 30 outputs electric power to each power supply unit 10 (S1308) and then completes the hot-line insertion of the power apparatus.

The above processing performs the hot-removal and hot-plugging of the power supply unit 10, so that it can change the configuration of the power supply unit 10 while allowing the computer apparatus to be kept working.

Figure 22:
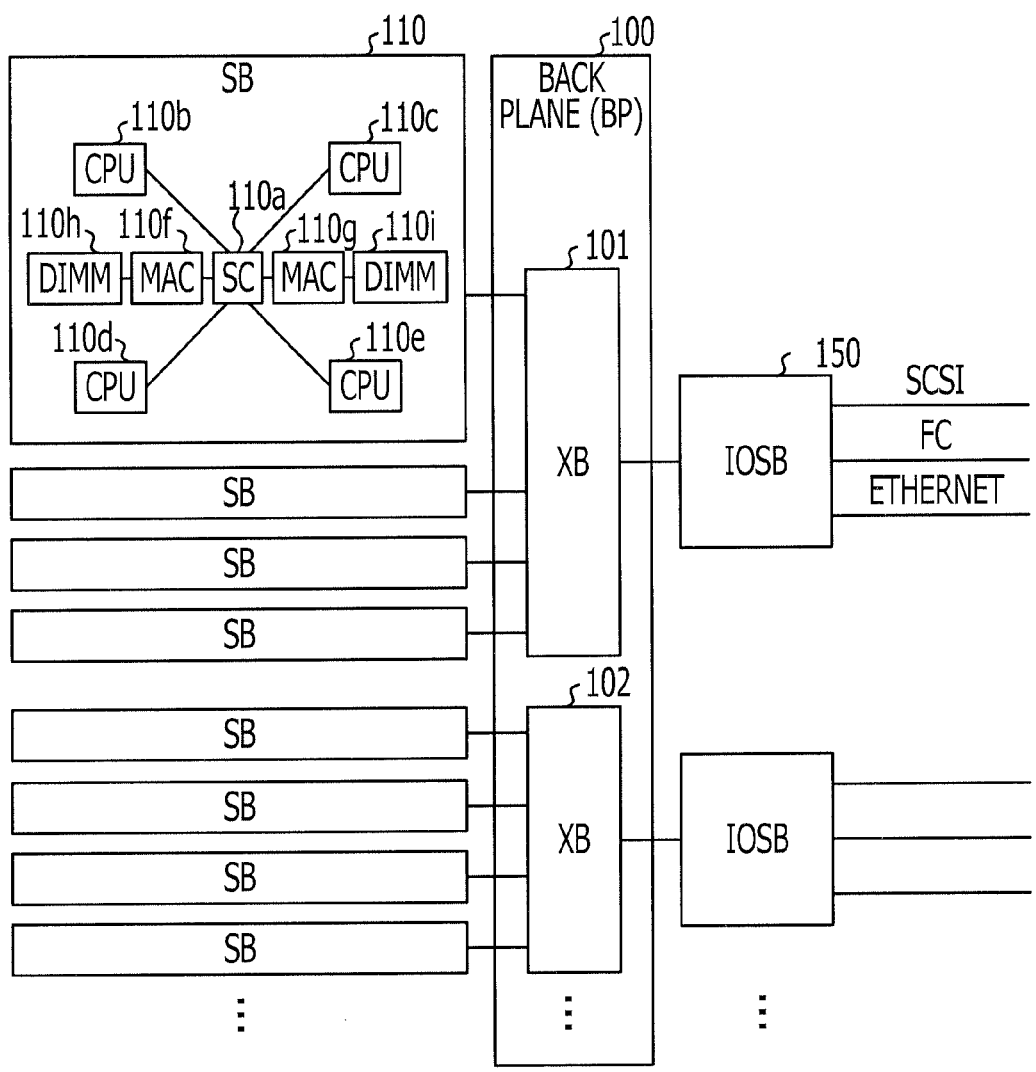
FIG. 22 is a diagram illustrating an exemplary configuration of a server that employs the power supply system of the present embodiment.

FIG. 22 is a diagram illustrating an exemplary configuration of a server that employs the power supply system of the present embodiment. As depicted in FIG. 22, the server includes a plurality of crossbar (XB) boards on a back plane (BP) 100, such as XB 101 and XB 102. System boards SB110 to SB113 and I/O system boards (IOSB) are mounted on the crossbar (XB) boards, respectively. Here, the numbers of the crossbar (XB) boards, system boards, and I/O system boars are provided only for illustrative purposes and are not limited thereto.

The back plane (BP) 100 is a printed circuit board assembly that forms a bus interconnecting a plurality of connectors and so on. The XB 101 and the XB 102 are switches that dynamically select the passage of data exchanged between the system boards and the I/O system boards, respectively.

In addition, the SB 110, SB 111, SB 112, and SB 113 which are respectively connected to the XB 101 and XB 102 are electronic circuit boards that constitute an electronic apparatus and have the identical configuration. Thus, the description of the SB 110 will be representative of them. The SB 110 includes a system controller (SC) 110a, four CPUs, a memory access controller (MAC), and a DIMM.

The SC110a controls processing, such as data transfer between the CPU 110b to CPU 110e and the MAC 110f and MAC 110g mounted on the SB 110, to control the whole of the SB100. Each of the CPUs 110b to 110e is a processor connected to another electronic device through the SC 110a. The MAC 110f is connected between the DIMM 110h and the SC 110a to control access to the DIM 110h. The MAC 110g is connected between the DIMM 110i and the SC 110a to control access to the DIMM 110i. The DIMM 110h is a memory module connected to another electric device through the SC 110a and used for memory extension or the like where a memory is mounted on the DIMM 110h. The DIMM 110i is a memory module connected to another electronic apparatus through the SC 110a and used for memory extension or the like where a memory is mounted on the DIMM 110i.

The IOSB 150 is connected to each of the SB 110 to SB 113 through the XB 101 and also connected to an I/O device through a small computer system interface (SCSI), a fibre channel (FC), Ethernet (registered trademark), or the like. The IOSB150 controls the processing of data transfer between the I/O device and the XB101, and so on. The electronic devices, such as the CPUs, the MACs, and the DIMMs, mounted on the SB 110 are only provided for illustrative purposes. The types or number of the electronic devices are not limited to those illustrated in the figure.

The SB 110, the back plane 110, the XB 101, and the IOSB 150 in the configuration depicted in FIG. 22 operate as load units in the disclosed power supply system, respectively. In other words, a single voltage is supplied as a power supply voltage to the inside of each of the load units and divided into main voltage and stand-by voltage before use. Therefore, the application of the server depicted in FIG. 22 to the disclosed power supply system leads to effective power supply in response to the operation state of the server.

As described above, in the power supply system, the electronic apparatus, and the method for controlling such a power supply system of the present embodiment uses a plurality of power supply units connected in parallel, where each of them outputs single voltage, and uses the output single voltage after dividing the single voltage into main voltage and stand-by voltage. Therefore, the power supply unit has any configuration that performs output for stand-by, so that even though a stand-by load current is small or large or a main load current is large or small, power consumption can be efficiently enhanced and power-saving can be realized.

For example, if the power supply unit is designed so that the loss of the main power is lowered to achieve an efficiency of 90%, the loss of the voltage of the stand-by power may increase and the efficiency may decrease and reach to an about of 50%. In this way, in the configuration of the power supply unit which can output a plurality of voltages, an increase in loss occurs. Thus, there is no stand-by power supply formed, while the efficiency can be improved by using the main power. In other words, the output of the power supply unit can be performed with a high load factor which is an efficient area. Thus, an increase in efficiency can be attained.

In addition, there is no need of any stand-by power supply circuit. Thus, the housing of the power supply can be minimized or an increase in power capacity can be attained even if the housing of the power supply is not changed.

Furthermore, even if the electronic apparatus include a plurality of power supply units, for example four power supply units, three of them can be shut off if the rest is able to sufficiently supply electric power by itself. The efficiency control can be performed by the control of the number of the power supply units in operation. For example, even if the efficiency reaches 25% when four power supply units output electric power at a load factor of 20%, one power supply unit can output electric power at a load factor of 80%. Therefore, in contrast to the conventional case in which four power supply units are activated and the loss is generated from each of four power supply units, the present embodiment can start up one power supply unit and the loss can be limited to one corresponding to the loss from the single power supply unit.

Conventionally, furthermore, if the operating rate of the electronic apparatus is low, the efficiency is poor since power supply unit is used with a low load factor. The configuration disclosed in the present embodiment can delete the stand-by power supply unit, where the "loss present on a steady basis"="driving loss Pd", can be removed. Thus, high efficiency can be attained. In addition, the removal of the stand-by power supply unit itself can realize cost reduction.

Furthermore, to cope with an increase in stand-by current that occurs in proportion to an improvement in processing performance of the electronic device, the configuration of the disclosed embodiment allows the main power supply with a large current to be branched to a stand-by voltage. Thus, a sufficient supply of voltage can be attained. Therefore, any retardant power device mounted for the purpose of ensuring a stand-by current becomes unnecessary. Thus, the capacity and the cost of the apparatus can be reduced. In addition, in the configuration of the disclosed embodiment, the stand-by voltage is equal to the main power voltage (e.g., 12V). Thus, it is possible to respond a decrease in voltage to prevent the apparatus from causing a system failure.

In other words, when the circuit board causes a short circuit failure, 12V can be brought into the circuit board until fuse-melting occurs. However, other normal circuit boards can be successively operated even if a voltage dip occurs to about six volts (6V). In contrast, the conventional configuration of 3.3V requires any configuration that suppresses the voltage to a drop voltage of several 100 mV is hardly realized.

In addition, in the configuration of the disclosed embodiment, AC cables are connected to a plurality of power supply units on one-on-one basis. Even if there is a large stand-by current required for the unit side of the apparatus, it is possible to avoid information of a notice of a decrease in voltage due to over-current that exceeds the ability of supplying electric power of one AC power supply unit that supplies electric power to each of the power supply unit.

What is claimed is:

1. A power supply system, comprising:
 a plurality of power supply units, each power supply unit including:
  an output terminal connected to each of the other output terminals in parallel and to a plurality of load units, a power supply section that inputs an input voltage and outputs a first output voltage from the output terminal to the plurality of load units, the first output voltage matching a first output voltage from each of the other power supply units, a controller that is configured to, when the respective power supply unit is a master power supply unit, output an output current level of the power supply unit to at least one other of the plurality of power supply units as a current balance signal, and configured to, when the respective power supply unit is a slave power supply unit, receive a current balance signal from a master power supply unit and control an amplification rate so that the output current level of the power supply unit matches the current balance signal, and a shut-off control section that shuts off the output of the first output voltage from the output terminal based on an inputted shut-off signal; and a management control unit that is inputted a configuration information representing a configuration of each of the plurality of load units that receives the first output voltage from a respective power supply unit, and is configured to output the shut-off signal to one or more of the plurality of power supply units based on the configuration information, the configuration information being information that represents a type and operation state of hardware mounted on the respective load unit, wherein, when the configuration information represents that the configuration of each of the plurality of load units are in stand-by, the management control unit outputs the shut-off signal to the power supply units so as to leave one power supply unit in operation mode in case of non-redundant operation of the power supply units or so as to leave two power supply units in operation mode in case of redundant operation of the power supply units.

2. The power supply system according to claim 1, wherein the management control unit further inputs the respective first output voltages, and outputs the shut-off signal to one or more of the plurality of power supply units so that the first output voltage is not decreased based on the first output voltage and the configuration information inputted from each of the plurality of load units.

3. The power supply system according to claim 2, wherein the management control unit further includes a redundant operation setting information retaining section that retains setting information about the redundant operation for redundantly operating a plurality of power supply sections each included in the plurality of the power supply units; and the management control unit does not output the shut-off signal to any of the plurality of power supply units regardless of the configuration information inputted from each of the plurality of load units when the setting information about the redundant operation is retained in the redundant operation setting information retaining section.

4. An electronic apparatus, comprising:

a plurality of power supply units, each power supply unit including:

an output terminal connected to each of the other output terminals in parallel, a power supply section that inputs an input voltage and outputs a first output voltage from the output terminal, the first output voltage matching a first output voltage from each of the other power supply units, a controller that is configured to, when the respective power supply unit is a master power supply unit, output an output current level of the power supply unit to at least one other of the plurality of power supply units as a current balance signal, and configured to, when the respective power supply unit is a slave power supply unit, receive a current balance signal from a master power supply unit and control an amplification rate so that the output current level of the power supply unit matches the current balance signal, and a shut-off control section that shuts off the output of the first output voltage from the output terminal based on an inputted shut-off signal;

a plurality of load units, each load unit including:

a hardware resource in which a respective first output voltage is inputted, and a configuration information acquisition section that outputs configuration information representing the configuration of the hardware resource, the configuration information being information that represents a type and operation state of hardware mounted on the load unit; and a management control unit that is inputted the configuration information from the configuration information acquisition section of each of the plurality of load units, and is configured to output the shut-off signal to one or more of the plurality of power supply units based on the configuration information, wherein, when the configuration information represents that the configuration of each of the plurality of load units are in stand-by, the management control unit outputs the shut-off signal to the power supply units so as to leave one power supply unit in operation mode in case of non-redundant operation of the power supply units or so as to leave two power supply units in operation mode in case of redundant operation of the power supply units.

5. The electronic apparatus according to claim 4, wherein the management control unit further inputs the respective first output voltage, and outputs the shut-off signal to one or more of the plurality of power supply units so that the first output voltage is not decreased based on the first output voltage and the configuration information inputted from each of the plurality of load units.

6. The electronic apparatus according to claim 5, wherein the management control unit further includes a redundant operation setting information retaining section that retains setting information about the redundant operation for redundantly operating a plurality of power supply sections each included in the plurality of the power supply units; and the management control unit does not output the shut-off signal to any of the plurality of power supply units regardless of the configuration information inputted from each of the plurality of load units when the setting information about the redundant operation is retained in the redundant operation setting information retaining section.

7. A method for controlling a power supply system including a plurality of power supply units, each of which inputs an input voltage and outputs a first output voltage to a plurality of load units from an output terminal connected to each other in parallel and connected to the plurality of load units, the method comprising:

inputting, to a management control unit of the power supply system, configuration information that represents a configuration of each of the plurality of load units from each of the plurality of the load units in which a first voltage outputted from the power supply system is inputted, the configuration information being information that represents a type and operation state of hardware mounted on the respective load unit;

outputting, from a management control unit, a shut-off signal to one or more of the plurality of the power supply units based on the configuration information; and when the respective power supply unit is a master power supply unit, outputting an output current level of the power supply unit to at least one other of the plurality of power supply units as a current balance signal, and, when the respective power supply unit is a slave power supply unit, receiving a current balance signal from a master power supply unit and controlling an amplification rate so that the output current level of the power supply unit matches the current balance signal; and shutting off the output of the first output voltage from the output terminal based on the input shut-off signal by a shut-off control section included in each of the plurality of power supply units, wherein, when the configuration information represents that the configuration of each of the plurality of load units are in stand-by, the management control unit outputs the shut off signal to the power supply units so as to leave one the master power supply unit in operation mode in case of non-redundant operation of the power supply units or so as to leave two power supply units in operation mode in case of redundant operation of the power supply units.

8. The method for controlling a power supply system according to claim 7, wherein the management control unit further inputs the respective first output voltage, and outputs the shut-off signal to one or more of the plurality of power supply units so that the first output voltage is not decreased based on the first output voltage and the configuration information inputted from each of the plurality of load units.

9. The method for controlling a power supply system according to claim 8, wherein the management control unit further includes a redundant operation setting information retaining section that retains setting information about the redundant operation for redundantly operating a plurality of power supply sections each included in the plurality of the power supply units; and the management control unit does not output the shut-off signal to any of the plurality of power supply units regardless of the configuration information inputted from each of the plurality of load units when the setting information about the redundant operation is retained in the redundant operation setting information retaining section.

* * * * *